US011366127B2

(12) United States Patent
Nishikawa et al.

(10) Patent No.: US 11,366,127 B2
(45) Date of Patent: Jun. 21, 2022

(54) TESTING SYSTEM AND METHOD OF STARTING TESTING SYSTEM

(71) Applicant: SYSMEX CORPORATION, Kobe (JP)

(72) Inventors: Ken Nishikawa, Kobe (JP); Tetsuya Oda, Kobe (JP); Hidetaka Hayama, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 901 days.

(21) Appl. No.: 16/056,584

(22) Filed: Aug. 7, 2018

(65) Prior Publication Data
US 2019/0049474 A1   Feb. 14, 2019

(30) Foreign Application Priority Data

Aug. 10, 2017   (JP) .............................. JP2017-156089

(51) Int. Cl.
*G01N 1/00*      (2006.01)
*G01N 35/00*     (2006.01)
(Continued)

(52) U.S. Cl.
CPC ..... *G01N 35/00584* (2013.01); *G01N 1/2813* (2013.01); *G01N 1/30* (2013.01);
(Continued)

(58) Field of Classification Search
None
See application file for complete search history.

(56) References Cited

U.S. PATENT DOCUMENTS 5,988,857 A    11/1999   Ozawa et al.
7,790,107 B2    9/2010   Nakaya
(Continued)

FOREIGN PATENT DOCUMENTS

CN    101464237 A    6/2009
CN    103713141 A    4/2014
(Continued)

OTHER PUBLICATIONS

ABX Horiba, "Micros 60 CS/CT User Manual", ABX Horiba Diagnostics, Retrieved from the Internet: URL:http://www.helena.com/Operator%20Manuals/Micros%2060%20CS-CT%20User%27s%20Manual.pdf (retrieved on Dec. 18, 2018), Dec. 31, 2002.
(Continued)

*Primary Examiner* — Jyoti Nagpaul
(74) *Attorney, Agent, or Firm* — Metrolex IP Law Group, PLLC

(57) ABSTRACT

A testing system according to one or more embodiments may include: a smear preparing apparatus that prepares a smear slide by smearing a sample on a glass slide; a smear transporting apparatus that transports the smear slide; a controller; and a display part. The controller may cause the display part to display a selection screen on which one or more of the smear preparing apparatus and the smear transporting apparatus can be selected. Based on a selection on the selection screen, the one or more of the smear preparing apparatus and the smear transporting apparatus selected on the selection screen may run respective start operations.

18 Claims, 10 Drawing Sheets

(51) Int. Cl.
  *G01N 1/28* (2006.01)
  *G01N 1/30* (2006.01)
(52) U.S. Cl.
  CPC ... *G01N 35/0092* (2013.01); *G01N 35/00623* (2013.01); *G01N 35/00722* (2013.01); *G01N 35/00871* (2013.01); *G01N 35/00029* (2013.01); *G01N 2035/0091* (2013.01); *G01N 2035/00138* (2013.01)

(56) References Cited

U.S. PATENT DOCUMENTS

| | | | |
|---|---|---|---|
| 2006/0178776 A1* | 8/2006 | Feingold | G16H 40/63 700/245 |
| 2007/0148046 A1 | 6/2007 | Nakaya | |
| 2011/0189053 A1 | 8/2011 | Tatsutani et al. | |
| 2012/0201721 A1 | 8/2012 | Yamasaki | |
| 2013/0243652 A1 | 9/2013 | Nishigaki et al. | |
| 2013/0260414 A1 | 10/2013 | Yao et al. | |
| 2015/0357824 A1 | 12/2015 | Hasegawa et al. | |
| 2017/0003204 A1 | 1/2017 | Yamasaki et al. | |
| 2017/0108524 A1 | 4/2017 | Takagi et al. | |
| 2017/0191956 A1 | 7/2017 | Kuwabara et al. | |
| 2018/0173178 A1 | 6/2018 | Mushikabe et al. | |
| 2019/0011468 A1 | 1/2019 | Noda | |
| 2020/0182893 A1 | 6/2020 | Yao et al. | |

FOREIGN PATENT DOCUMENTS

| | | |
|---|---|---|
| CN | 106323724 A | 1/2017 |
| CN | 106777009 A | 5/2017 |
| CN | 106885913 A | 6/2017 |
| EP | 2990804 A1 | 3/2016 |
| JP | H3-251901 A | 11/1991 |
| JP | H3-279813 A | 12/1991 |
| JP | H4-313932 A | 11/1992 |
| JP | H6-222830 A | 8/1994 |
| JP | H10-49201 A | 2/1998 |
| JP | H10-62426 A | 3/1998 |
| JP | H11-142411 A | 5/1999 |
| JP | H11-223634 A | 8/1999 |
| JP | 2002-267942 A | 9/2002 |
| JP | 2003-215130 A | 7/2003 |
| JP | 2003-254980 A | 9/2003 |
| JP | 2007-178251 A | 7/2007 |
| JP | 2011-158303 A | 8/2011 |
| JP | 2012-159480 A | 8/2012 |
| JP | 2013-205193 A | 10/2013 |
| JP | 2014-070938 A | 4/2014 |
| JP | 2016-67353 A | 5/2016 |
| JP | 2017-15544 A | 1/2017 |
| JP | 2017-41008 A | 2/2017 |
| JP | 2017-75867 A | 4/2017 |
| JP | 2020-94843 A | 6/2020 |
| WO | 2012/070557 A1 | 5/2012 |
| WO | 2014/112259 A1 | 7/2014 |
| WO | 2017/033598 A1 | 3/2017 |

OTHER PUBLICATIONS

Sysmex America Inc, "Sysmex XP-300 (TM) Automated Hematology Analyzer", Youtube, Retrieved from the Internet: URL:https://www.youtube.com/watch?v=Z1kogGr7zzk (retrieved on Dec. 20, 2018), Nov. 26, 2013.
Office Action (CNOA) dated Oct. 22, 2020 in a counterpart Chinese patent application.
Office Action (CNOA) dated Aug. 10, 2021 for the counterpart Chinese patent application, with English translation.
Office Action (JPOA) dated Oct. 12, 2021 for the counterpart Japanese patent application, with English translation.
Office Action (EPOA) dated Nov. 12, 2021 in a counterpart European patent application.
Office Action (CNOA) dated May 14, 2021 in a counterpart Chinese patent application.
Office Action (JPOA) dated May 25, 2021 in a counterpart Japanese patent application.
Minasi et al., Inside MS-DOS 6 Technology Highlights, Aug. 31, 1994, p. 411, Tsinghua University Press; Cited in CNOA dated Mar. 14, 2022 in a counterpart Chinese patent application.
Changchun, Newsletter Yearbook of 2001, vol. 2, Nov. 30, 2001, p. 382, Sichuan Science and Technology; Cited in CNOA dated Mar. 14, 2022 in a counterpart Chinese patent application Press.
Shoda, Chapter 3 Mastering process control, Unreal Engine 4 Blue Print Complete Learning Tutorials in Chinese Version, Jun. 30, 2017, p. 91-92, China Youth Publishing House; Cited in CNOA dated Mar. 14, 2022 in a counterpart Chinese patent application.
Chinese Office Action dated Mar. 14, 2022 in a counterpart Chinese patent application.

* cited by examiner

FIG. 7
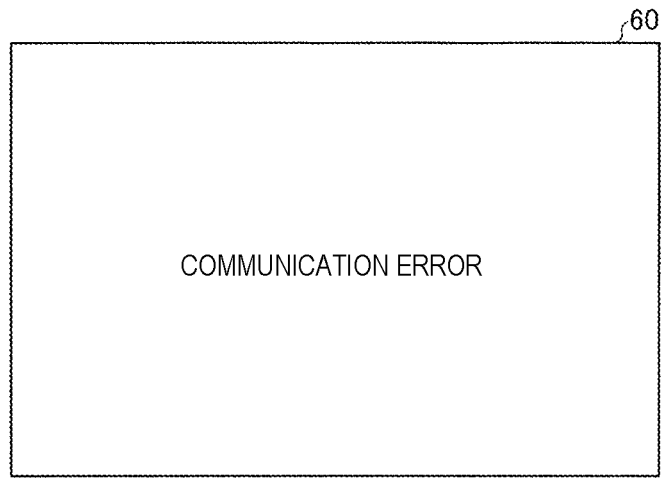
FIG. 8
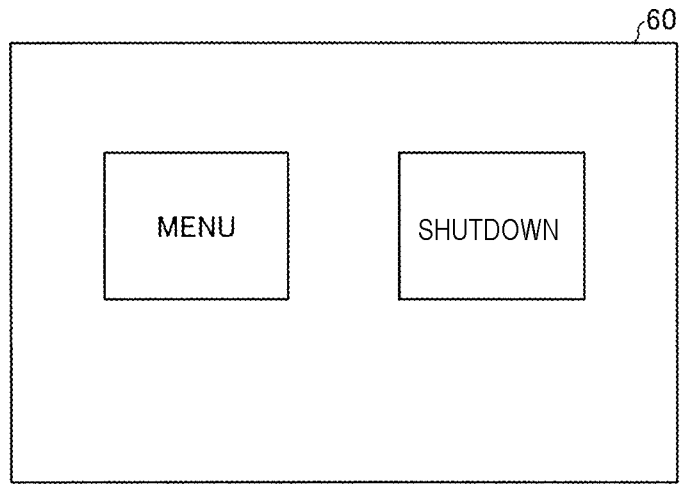
FIG. 9
|  | SMEAR PREPARING APPARATUS | SMEAR TRANSPORTING APPARATUS |
|---|---|---|
| CLEANING | ○ | — |
| MAGAZINE DISCHARGE | — | ○ |
| MECHANISM INITIALIZATION | ○ | ○ |
| POWER SUPPLY OFF | ○ | ○ |

TESTING SYSTEM AND METHOD OF STARTING TESTING SYSTEM

CROSS REFERENCE TO RELATED APPLICATIONS

This application claims priority from prior Japanese Patent Application No. 2017-156089 filed with the Japan Patent Office on Aug. 10, 2017, the entire contents of which are incorporated herein by reference.

BACKGROUND

This disclosure relates to a testing system and a method of starting a testing system.

As illustrated in FIG. 12, Japanese Patent Application Publication No. 2014-070938 (Patent Document 1) discloses a testing system 900 which includes: a smear preparing apparatus 902 that prepares a smear slide 901 by smearing a sample on a glass slide; a smear image capturing apparatus 903 that captures an image of the smear slide 901; and a smear transporting apparatus 904 that transports the smear slide 901 to the smear image capturing apparatus 903.

In a conventional testing system including multiple apparatuses, each of the apparatuses is provided with a start button and the apparatuses are started by operating the respective start buttons.

The conventional testing system involves complicated manipulations at start-up of the respective apparatuses since the apparatuses are started by manipulating the respective start buttons. Meanwhile, a smear preparing apparatus requires arrangement of a staining solution as well as cleaning of a smearing part and a fluid circuit before use. If one forgets to perform a start-up manipulation of such an apparatus, the testing system cannot be set out efficiently because it is necessary to further wait for the arrangement from the state of completion of the start-up manipulation. For this reason, a testing system and a method of starting a testing system which are capable of enhancing operability at the start-up of the testing system have been expected in order to set out the testing system efficiently.

SUMMARY

A testing system according to one or more embodiments may include: a smear preparing apparatus that prepares a smear slide by smearing a sample on a glass slide; a smear transporting apparatus that transports the smear slide; a controller; and a display part. The controller may cause the display part to display a selection screen on which one or more of the smear preparing apparatus and the smear transporting apparatus can be selected. Based on a selection on the selection screen, the one or more of the smear preparing apparatus and the smear transporting apparatus selected on the selection screen may run respective start operations.

A testing system according to one or more embodiments may include: a controller; a display part; a start switch; and apparatuses each comprising a master electrical switch. When the start switch is turned on in a condition in which the respective master electrical switches of the apparatuses are on, the controller may cause the display part to display a selection screen on which one or more of the apparatuses can be selected. Based on a selection on the selection screen, the one or more of the apparatuses selected on the selection screen may run respective start operations.

A method of starting a testing system according to one or more embodiments may include: displaying a selection screen on which one or more of apparatuses can be selected, and causing each apparatus selected on the selection screen to run a start operation.

BRIEF DESCRIPTION OF DRAWINGS

FIG. 7 is a diagram illustrating a third display example of a display part;

FIG. 8 is a diagram illustrating a fourth display example of a display part;

FIG. 9 is a table illustrating an example of ending operations of a smear preparing apparatus and a smear transporting apparatus;

DETAILED DESCRIPTION

Figure 1:
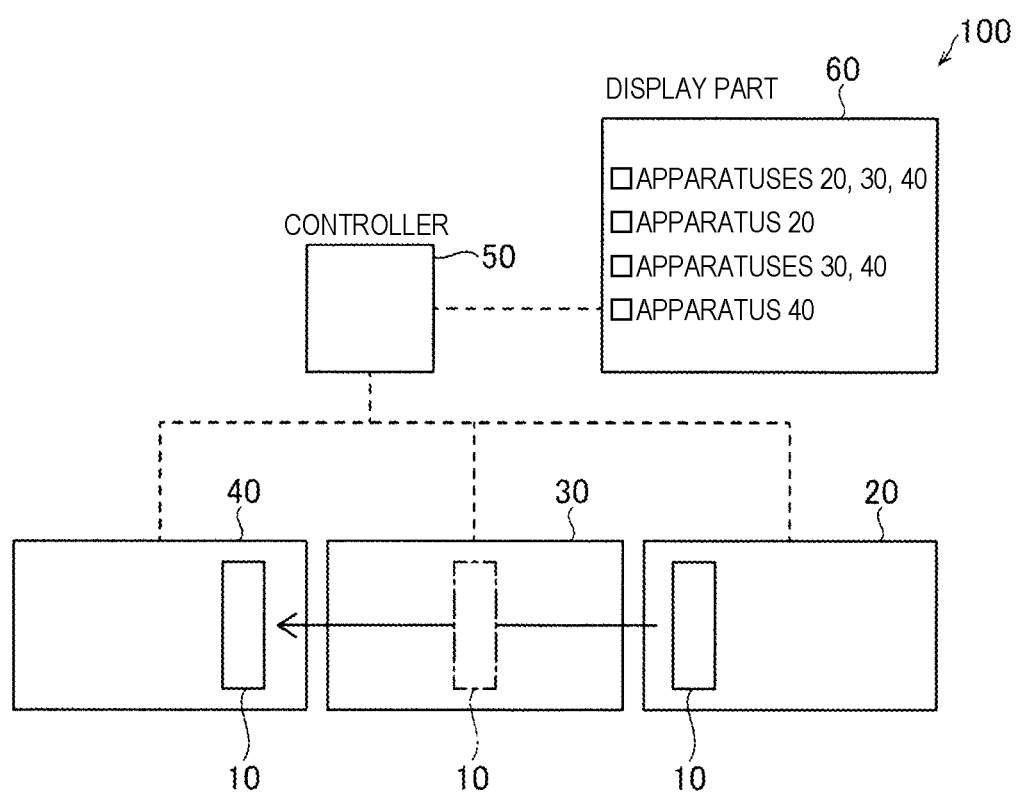
FIG. 1 is a schematic diagram illustrating an overview of a testing system according to an embodiment.

One or more aspects may be directed to enhance operability at start-up of a testing system.

A testing system (100) according to a first aspect includes a smear preparing apparatus (20) that prepares a smear slide (10) by smearing a sample on a glass slide, a smear transporting apparatus (30) that transports the smear slide (10), a controller (50), and a display part (60). Here, the controller (50) causes the display part (60) to display a selection screen that allows selection of the apparatuses or one of the apparatuses, and each of the smear preparing apparatus (20), a smear image capturing apparatus (40), and the smear transporting apparatus (30) sets out, starts, or runs a start-up operation based on the selection on the selection screen. Here, the "start-up operation" or "start operation" means an action of each apparatus to establish a standby state of its mechanism in order to work on the smear slide.

As described above, the testing system (100) according to a first aspect includes the controller (50) that causes the display part (60) to display the selection screen that allows selection of multiple apparatuses or a single apparatus, and each of the smear preparing apparatus (20) and the smear transporting apparatus (30) is configured to set out, starts, or runs the start-up operation based on the selection on the selection screen. This enables the manipulation based on the selection screen of the display part (60), so that the chance of forgetting to perform the start-up manipulation can be reduced. In this way, it is possible to reduce the chance of forgetting to perform the start-up manipulation of an apparatus such as the smear preparing apparatus (20) that requires arrangement of a staining solution as well as cleaning of a smearing part and a fluid circuit before use, and thus to set out the testing system efficiently. As a consequence, it is possible to enhance operability at the start-up of the testing system (100). Meanwhile, it is possible to conduct the manipulation based on the same selection screen of the display part (60) both in the case of setting out the start-up operations of the multiple apparatuses or starting the multiple apparatuses and in the case of setting out the start-up operation of the single apparatus or starting the single apparatus. This can also enhance the operability at the start-up of the testing system (100). Moreover, it is possible to set out, start, or run the start-up operations of the multiple apparatuses and the single apparatus out of the smear preparing apparatus (20) and the smear transporting apparatus (30). Accordingly, expendables such as staining solutions for preparing the smear need not be arranged when the smear preparing apparatus (20) is not used, for example. Hence, it is possible to keep the expendables from being wasted.

It may be preferable that, in the above-described testing system (100) according to a first aspect, the smear preparing apparatus (20) includes a smearing part (230) that smears the sample, and a fluid circuit (270) that supplies or feeds a fluid, and the smear preparing apparatus (20) cleans at least one of the smearing part (230) and the fluid circuit (270) as the start-up operation. According to this configuration, the smearing part (230) is cleaned even when a foreign substance attaches to the smearing part (230) during an inactive period, so that the foreign substance can be removed from the smearing part (230). This makes it possible to conduct the smearing in good condition. Moreover, a cleaning agent is not introduced to or into the fluid circuit (270) when the smear preparing apparatus (20) is not used. This makes it possible to effectively keep the cleaning agent from being wasted.

It may be preferable that, in the above-described testing system (100) according to a first aspect, the smear preparing apparatus (20) initializes a driving mechanism (90) as the start-up operation. According to this configuration, it is possible to activate the driving mechanism (90) at high accuracy since the driving mechanism (90) is initialized in the case of using the smear preparing apparatus (20).

It may be preferable that, the above-described testing system (100) according to a first aspect includes a staining part (250) that stains the smear slide (10) smeared with the sample, and the smear preparing apparatus (20) introduces a staining solution to or into the staining part (250) as the start-up operation. According to this configuration, the staining solution is not introduced to or into the staining part (250) when the smear preparing apparatus (20) is not used. This makes it possible to effectively keep the staining solution from being wasted.

It may be preferable that, the above-described testing system (100) according to a first aspect includes a start switch (80). Here, each of the smear preparing apparatus (20) and the smear transporting apparatus (30) It may be preferable that includes a master electrical switch (22, 36), and when the respective master electrical switches (22, 36) of the smear preparing apparatus (20) and the smear transporting apparatus (30) are on, the controller (50) performs control to cause the display part (60) to display the selection screen on grounds that the start switch (80) is turned on. According to this configuration, it is possible to select the apparatus to use by manipulating the start switch (80). As a consequence, the start-up operation of the apparatus to use can be set out at a desired timing.

It may be preferable that, in the above-described configuration including the start switch (80), when the master electrical switch (22) of the smear preparing apparatus (20) is on and the master electrical switch (36) of the smear transporting apparatus (30) is on, the controller (50) performs control to cause the display part (60) to display the selection screen on grounds that the start switch (80) is turned on. According to this configuration, it is possible to cause the display part (60) to display the selection screen in the state where both the master electrical switch (22) of the smear preparing apparatus (20) and the master electrical switch (36) of the smear transporting apparatus (30) are on.

It may be preferable that, in the above-described configuration including the start switch (80), when the master electrical switch (22) of the smear preparing apparatus (20) is on and the master electrical switch (36) of the smear transporting apparatus (30) is off, the controller (50) performs control to cause the display part (60) to display an error notification on grounds that the start switch (80) is turned on. According to this configuration, the error notification is displayed even in the case of forgetting to turn on the master electrical switches (22, 36). Thus, it is possible to reduce the chance of forgetting to perform the start-up manipulation.

It may be preferable that, in the above-described testing system (100) according to a first aspect, the controller (50) causes the display part (60) to display a selection screen that allows selection of the smear transporting apparatus (30), and the smear transporting apparatus (30) sets out, starts, or runs the start-up operation based on the selection on the selection screen. According to this configuration, it is possible to easily start the smear transporting apparatus (30) based on the selection by the user on the selection screen.

It may be preferable that, in the above-described testing system (100) according to a first aspect, the controller (50) is provided in the smear preparing apparatus (20). Moreover, the controller (50) controls operations of the smear preparing apparatus (20) and the smear transporting apparatus (30), and performs control to set out, start, or run the start-up operations of the smear preparing apparatus (20) and the smear transporting apparatus (30) based on the selection on the selection screen of the display part (60). According to this configuration, it is not necessary to provide the controller to the smear transporting apparatus (30). Thus, it is possible to simplify the apparatus configuration and to reduce the number of components. In addition, it is possible to easily start the smear preparing apparatus (20) and the smear transporting apparatus (30) by using the controller (50) provided in the smear preparing apparatus (20).

It may be preferable that, the above-described testing system (100) according to a first aspect includes a smear image capturing apparatus (40) that captures an image of the smear slide (10). Here, the smear transporting apparatus (30) is constructed to deliver the smear slide (10) before image capturing to the smear image capturing apparatus (40) and to receive the smear slide (10) after the image capturing from the smear image capturing apparatus (40). Meanwhile, the controller (50) selectively conducts any of control to set out the start-up operation of the smear preparing apparatus (20) as well as the smear transporting apparatus (30) and control to set out the start-up operation of the smear transporting apparatus (30) based on the selection on the selection screen of the display part (60). According to this configuration, it is possible to set out the start-up operations of the single apparatus or the multiple apparatuses corresponding to both an operation to prepare and transport the smear slide (10) and an operation to transport and capture the image of the smear slide (10).

It may be preferable that, in the above-described testing system (100) according to a first aspect, the smear image capturing apparatus (40) includes a controller (42), while the controller (50) and the controller (42) of the smear image capturing apparatus (40) are made communicable to each other, and the controllers control the apparatuses in cooperation. According to this configuration, it is possible to smoothly perform treatments on the smear slide (10) by bringing the multiple apparatuses into cooperation.

It may be preferable that, in the above-described testing system (100) according to a first aspect, the smear transporting apparatus (30) includes a magazine transporter (32) that transports a slide magazine (11) holding the smear slide (10), and a sensor (32d) that detects the slide magazine (11) being set to the magazine transporter (32). Moreover, the smear transporting apparatus (30) transports the slide magazine (11) by using the magazine transporter (32) based on detection of the slide magazine (11) by the sensor (32d). According to this configuration, even in the case of not using the smear preparing apparatus (20), it is possible to capture the image of the smear slide (10) with the smear image capturing apparatus (40) by setting the slide magazine (11) to the smear transporting apparatus (30).

It may be preferable that, in the above-described testing system (100) according to a first aspect, the controller (50) causes the display part (60) to display an end selection screen that allows selection of ending of an activity, and the smear preparing apparatus (20), the smear image capturing apparatus (40), and the smear transporting apparatus (30) end activities after ending operations of the apparatuses based on the selection on the end selection screen. According to this configuration, even when the manipulation to end the activities of the apparatuses in operation takes place, it is possible to wait to end the activities until the operations are ended. Moreover, it is possible to manipulate the ending of the activities of the multiple apparatuses in a lump based on the end selection screen of the display part (60). Thus, it is possible to enhance operability at the time of ending the activities of the apparatuses in the testing system (100).

It may be preferable that, in the above-described configuration in which the controller (50) causes the display part (60) to display the end selection screen that allows selection of ending of an activity, in the case of ending the activities of the smear preparing apparatus (20) and the smear transporting apparatus (30), the controller (50) performs control to end the activity of the smear preparing apparatus (20) after an end of the operation of the smear preparing apparatus (20), and then performs control to end the activity of the smear transporting apparatus (30). According to this configuration, the smear preparing apparatus (20) can be kept from ending its activity in the course of the operation. In this way, it is possible to end the activity of the smear preparing apparatus (20) after the smear slide (10) is finished. Moreover, since it is possible to keep the smear transporting apparatus (30) from ending its activity when the smear preparing apparatus (20) is active, the finished smear slide (10) can be reliably delivered to the smear transporting apparatus (30).

It may be preferable that, in the above-described configuration in which the controller (50) causes the display part (60) to display the end selection screen that allows selection of ending of an activity, the smear preparing apparatus (20) includes the staining part (250) that stains the smear slide (10) smeared with the sample, and when the smear preparing apparatus (20) ends the activity, the smear preparing apparatus (20) discharges a staining solution from the staining part (250). According to this configuration, when ending the activity of the smear preparing apparatus (20), it is possible to empty the staining part (250) of the staining solution. Thus, the staining part (250) can be kept from being left for a long period in the state of storing the staining solution therein.

It may be preferable that, in the above-described configuration in which the controller (50) causes the display part (60) to display the end selection screen that allows selection of ending of an activity, the smear preparing apparatus (20) includes the smearing part (230) that smears the sample, and the fluid circuit (270) that supplies or feeds a fluid. Moreover, when the smear preparing apparatus (20) ends the activity, the smear preparing apparatus (20) cleans at least one of the smearing part (230) and the fluid circuit (270). According to this configuration, even when a foreign substance attaches to the smearing part (230), the foreign substance can be removed from the smearing part (230) since the smearing part (230) is cleaned. Thus, it is possible to keep the foreign substance from adhering to the smearing part (230) during an inactive period. Meanwhile, even when a foreign substance attaches to the fluid circuit (270), the foreign substance can be removed from the fluid circuit (270) since the fluid circuit (270) is cleaned. Thus, it is possible to keep the foreign substance from adhering to the fluid circuit (270) during an inactive period.

It may be preferable that, in the above-described configuration in which the controller (50) causes the display part (60) to display the end selection screen that allows selection of ending of an activity, when the smear preparing apparatus (20) ends the activity, the smear preparing apparatus (20) initializes the driving mechanism (90). According to this configuration, the driving mechanism (90) is initialized when ending the activity of the smear preparing apparatus (20). Thus, it is possible to maintain driving accuracy of the driving mechanism (90).

A testing system (100) according to a second aspect includes: a controller (50), a display part (60), a start switch (80), and apparatuses (20, 30, 40) each provided with a master electrical switch (22, 36, 44). When the respective master electrical switches (22, 36, 44) of the apparatuses (20, 30, 40) are on, the controller (50) performs control to cause the display part (60) to display a selection screen that allows selection of the apparatuses or one of the apparatuses on grounds that the start switch (80) is turned on, and each of the apparatuses or the one apparatus sets out, starts, or runs a start-up operation based on the selection on the selection screen. Here, the "start-up operation" or "start operation" means the action of each apparatus to establish the standby state of its mechanism in order to work on the smear slide.

As described above, the testing system (100) according to a second aspect includes the controller (50) that causes the display part (60) to display the selection screen that allows selection of multiple apparatuses or a single apparatus, and is configured such that a start-up operation sets out, starts, or runs based on the selection on the selection screen. This enables the manipulation based on the selection screen of the display part (60), so that the chance of forgetting to perform the start-up manipulation can be reduced. In this way, it is possible to reduce the chance of forgetting to perform the start-up manipulation of an apparatus such as the smear preparing apparatus (20) that requires arrangement of a staining solution as well as cleaning of a smearing part and a fluid circuit before use, and thus to set out the testing system efficiently. As a consequence, it is possible to enhance operability at the start-up of the testing system (100). Meanwhile, it is possible to conduct the manipulation based on the same selection screen of the display part (60) both in the case of setting out the start-up operations of the multiple apparatuses or starting the multiple apparatuses and in the case of setting out the start-up operation of the single apparatus or starting the single apparatus. This can also enhance the operability at the start-up of the testing system (100). Moreover, since it is possible to set out, start, or run the start-up operations of the multiple apparatuses and the single apparatus, expendables such as staining solutions for preparing the smear need not be arranged when the smear preparing apparatus (20) is not used, for example. Hence, it is possible to keep the expendables from being wasted. Meanwhile, when the respective master electrical switches (22, 36) are on, control to cause the display part (60) to display the selection screen is performed on grounds that the start switch (80) is turned on. Thus, it is possible to select the apparatus to use by manipulating the start switch (80). Accordingly, the start-up operation of the apparatus to use can be set out at a desired timing.

It may be preferable that, in the above-described testing system (100) according to a second aspect, when at least one of the master electrical switches (22, 36, 44) of the smear preparing apparatus (20) that prepares the smear slide (10) by smearing a sample on a glass slide and the smear transporting apparatus (30) that transports the smear slide (10) is off, the controller (50) performs control to cause the display part (60) to display an error notification when the start switch (80) is turned on. According to this configuration, the error notification is displayed even in the case of forgetting to turn on the master electrical switches (22, 36, 44). Thus, it is possible to reduce the chance of forgetting to perform the start-up manipulation.

It may be preferable that, in the above-described testing system (100) according to a second aspect, the apparatuses include the smear preparing apparatus (20) that prepares the smear slide (10) by smearing a sample on a glass slide; the smear image capturing apparatus (40) that captures an image of the smear slide (10); and the smear transporting apparatus (30) that transports the smear slide (10) to the smear image capturing apparatus (40). According to this configuration, it is possible to enhance operability at the start-up of the testing system (100) that includes the smear preparing apparatus (20), the smear transporting apparatus (30), and the smear image capturing apparatus (40).

A method of starting a testing system (100) according to a third aspect includes: displaying a selection screen that allows selection of apparatuses or one of the apparatuses, and causing each apparatus selected on the selection screen to set out a start-up operation. Here, the "start-up operation" or "start operation" means the action of each apparatus to establish the standby state of its mechanism in order to work on the smear slide.

According to the configuration described above, in the method of starting a testing system (100) according to a third aspect, it is possible to reduce the chance of forgetting to perform the start-up manipulation of an apparatus such as the smear preparing apparatus (20) that requires arrangement of a staining solution as well as cleaning of a smearing part and a fluid circuit before use, and thus to set out the testing system efficiently. As a consequence, it is possible to enhance operability at the start-up of the testing system (100). Meanwhile, it is possible to conduct the manipulation based on the same selection screen of the display part (60) both in the case of setting out the start-up operations of the multiple apparatuses or starting the multiple apparatuses and in the case of setting out the start-up operation of the single apparatus or starting the single apparatus. This can also enhance the operability at the start-up of the testing system (100). Moreover, since it is possible to set out, start, or run the start-up operations of the multiple apparatuses and the single apparatus, expendables such as staining solutions for preparing the smear need not be arranged when the smear preparing apparatus (20) is not used, for example. Hence, it is possible to keep the expendables from being wasted.

It may be preferable that, in the above-described method of starting a testing system (100) according to a third aspect, as the start-up operation, the smear preparing apparatus (20) that prepares the smear slide (10) by smearing a sample on a glass slide cleans at least one of the smearing part (230) that smears the sample and the fluid circuit (270) that supplies or feeds a fluid. According to this configuration, the smearing part (230) is cleaned even when a foreign substance attaches to the smearing part (230) during an inactive period, so that the foreign substance can be removed from the smearing part (230). This makes it possible to conduct the smearing in good condition. Moreover, a cleaning agent is not introduced to or into the fluid circuit (270) when the smear preparing apparatus (20) is not used. This makes it possible to effectively keep the cleaning agent from being wasted.

It may be preferable that, in the above-described method of starting a testing system (100) according to a third aspect, as the start-up operation, the smear preparing apparatus (20) that prepares the smear slide (10) by smearing a sample on a glass slide initializes the driving mechanism (90). According to this configuration, it is possible to activate the driving mechanism (90) at high accuracy since the driving mechanism (90) is initialized in the case of using the smear preparing apparatus (20).

It may be preferable that, in the above-described method of starting a testing system (100) according to a third aspect, as the start-up operation, the smear preparing apparatus (20) that prepares the smear slide (10) by smearing a sample on a glass slide introduces a staining solution to or into the staining part (250) that stains the smear slide (10) smeared with the sample. According to this configuration, the staining solution is not introduced to or into the staining part (250) when the smear preparing apparatus (20) is not used. This makes it possible to effectively keep the staining solution from being wasted.

It may be preferable that, in the above-described method of starting a testing system (100) according to a third aspect, the testing system (100) includes the start switch (80), while each of the apparatuses (20, 30) includes a master electrical switch (22, 36), and when the respective master electrical switches (22, 36) of the apparatuses (20, 30) are on, the selection screen is displayed on grounds that the start switch (80) is turned on. According to this configuration, when the master electrical switches (22, 36) are on at the start-up of the respective apparatuses, the user can select the setout of the start-up operation on the selection screen, so that it is possible to easily start the apparatus to use. Moreover, it is possible to select the apparatus to use by manipulating the start switch (80). Accordingly, the start-up operation of the apparatus to use can be set out at a desired timing.

It may be preferable that, in the above-described configuration including the start switch (80), when at least one of the master electrical switches (22, 36) of the apparatuses (20, 30) is off, the error notification is displayed when the start switch (80) is turned on. According to this configuration, the error notification is displayed even in the case of forgetting to turn on the master electrical switches (22, 36). Thus, it is possible to reduce the chance of forgetting to perform the start-up manipulation.

According to one or more aspects, it may be possible to enhance operability at the start-up of the testing system.

An embodiment is explained below with reference to drawings.

[Overview of Testing System]

First, an overview of a testing system 100 of an embodiment is explained with reference to FIG. 1.

The testing system 100 is a system that tests a sample of a subject. The testing system 100 is a system that prepares, transports, and captures an image of a smear slide 10.

Though the subject is primarily a human, the subject may instead be an animal other than humans. The testing system 100 conducts a clinical test or an analysis for a medical research on a sample collected from a patient, for example. The sample is a sample derived from a living body. Examples of the sample derived from the living body include: liquids collected from the subject such as blood (whole blood, serum, or plasma), urine, and other body fluids; liquids obtained by subjecting the collected body fluid or blood to a prescribed pretreatment; and the like. Alternatively, the sample may be part of tissues, cells, and the like of the subject other than the liquids, for example. The testing system 100 prepares the smear slide 10 by smearing the sample on a glass slide. Moreover, the testing system 100 transports and capture an image of the prepared smear slide 10.

As illustrated in FIG. 1, the testing system 100 includes multiple apparatuses, namely, a smear preparing apparatus 20, a smear transporting apparatus 30, and a smear image capturing apparatus 40. Moreover, the testing system 100 includes a controller 50 and a display part 60.

The smear preparing apparatus 20 is an apparatus that conducts a smear treatment to smear the sample on the glass slide, and subjects the smear slide 10 smeared with the sample to a stain treatment of the sample. The smear preparing apparatus 20 prepares the smear slide 10 by aspirating a specimen as the sample, dripping and smearing the specimen on the glass slide, and then staining the specimen.

The smear transporting apparatus 30 receives the smear slide 10 prepared by the smear preparing apparatus 20 and transports the smear slide 10 to the smear image capturing apparatus 40. Moreover, the smear transporting apparatus 30 receives and stores the smear slide 10 after the image capturing by the smear image capturing apparatus 40.

The smear image capturing apparatus 40 captures an image of the smear slide 10 transported by the smear transporting apparatus 30. The smear image capturing apparatus 40 includes and image capturing part provided with a microscope and a camera. The image captured by the image capturing part is analyzed by an analyzer. The analyzer includes a computer, for example. The analyzer executes image processing, classification processing, and the like on the image captured by the image capturing part.

The controller 50 includes a CPU and a memory, for example. Moreover, the controller 50 can communicate with the smear preparing apparatus 20, the smear transporting apparatus 30, and the smear image capturing apparatus 40. The controller 50 is provided in the smear preparing apparatus 20, for example. Meanwhile, the controller 50 controls operations of the smear preparing apparatus 20. Moreover, the controller 50 controls operations of the smear transporting apparatus 30. The controller 50 controls each of the smear preparing apparatus 20 and the smear transporting apparatus 30 by using a control program.

The display part 60 performs display for manipulations or operations of the testing system 100, display of conditions of the testing system 100, and the like. The display part 60 includes a liquid crystal display, an organic EL display, and the like. Moreover, the display part 60 is provided with a touch panel so that the display part 60 can accept manipulations or operations by a user. The display part 60 is provided in the smear preparing apparatus 20, for example.

Here, the controller 50 causes the display part 60 to display a selection screen allowing selection of multiple apparatuses or a single apparatus to set out start-up. In other words, one or more of the apparatuses for which start-up operations or start operations need to be set out, started, or run can be selected on the selection screen. Then, the smear preparing apparatus 20, the smear image capturing apparatus 40, and the smear transporting apparatus 30 set out, start, or run the start-up operations or start operations based on the selection on the selection screen. Based on the selection, the controller 50 controls the setout of the start-up operations of the multiple apparatuses or the single apparatus. In other words, the smear preparing apparatus 20, the smear image capturing apparatus 40, and the smear transporting apparatus 30 set out, start or run the respective start-up operations or start operations based on the selection on the selection screen. In this way, it is possible to perform the operations based on the selection screen of the same display part 60 both in the case of preparing or starting the multiple apparatuses and in the case of preparing or starting the single apparatus, and thus to enhance operability at the start-up of the testing system 100.

For instance, as in the example illustrated in FIG. 1, the controller 50 causes the display part 60 to display: an option to set out the start-up operations of the smear preparing apparatus 20, the smear transporting apparatus 30, and the smear image capturing apparatus 40; an option to set out the start-up operation of the smear preparing apparatus 20 alone; an option to set out the start-up operations of the smear transporting apparatus 30 and the smear image capturing apparatus 40; and an option to set out the start-up operation of the smear image capturing apparatus 40 alone. Then, based on the option selected by the user on the selection screen of the display part 60, the controller 50 sets out the start-up operation of each of the selected apparatuses. Here, certain apparatus or apparatuses out of the multiple apparatuses may be set in the started state irrespective of activities of other apparatuses. For example, the smear image capturing apparatus 40 may be in the started state. In this case, since the smear image capturing apparatus 40 is in the active state, the smear image capturing apparatus 40 does not have to be displayed as an option on the selection screen to be displayed on the display part 60.

Here, the testing system 100 may include other apparatuses. For example, the testing system 100 may include an analyzer that analyzes the sample, or a transporting apparatus that transports a container holding the sample.

[Explanation of Construction of Testing System]

A specific construction example of the testing system 100 is explained with reference to FIGS. 2 to 11.

Figure 2:
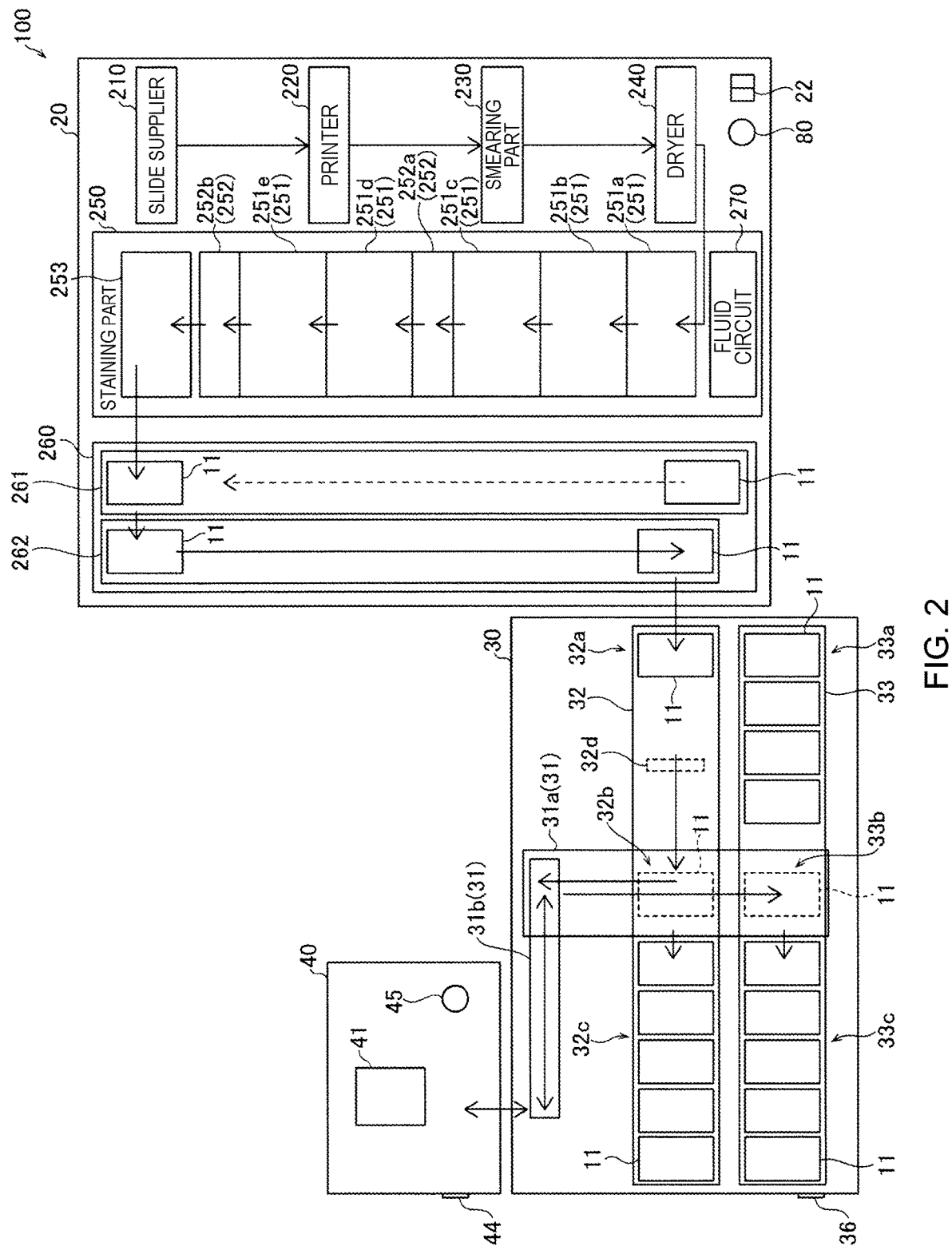
FIG. 2 is a plan view illustrating a testing system.
Figure 3:
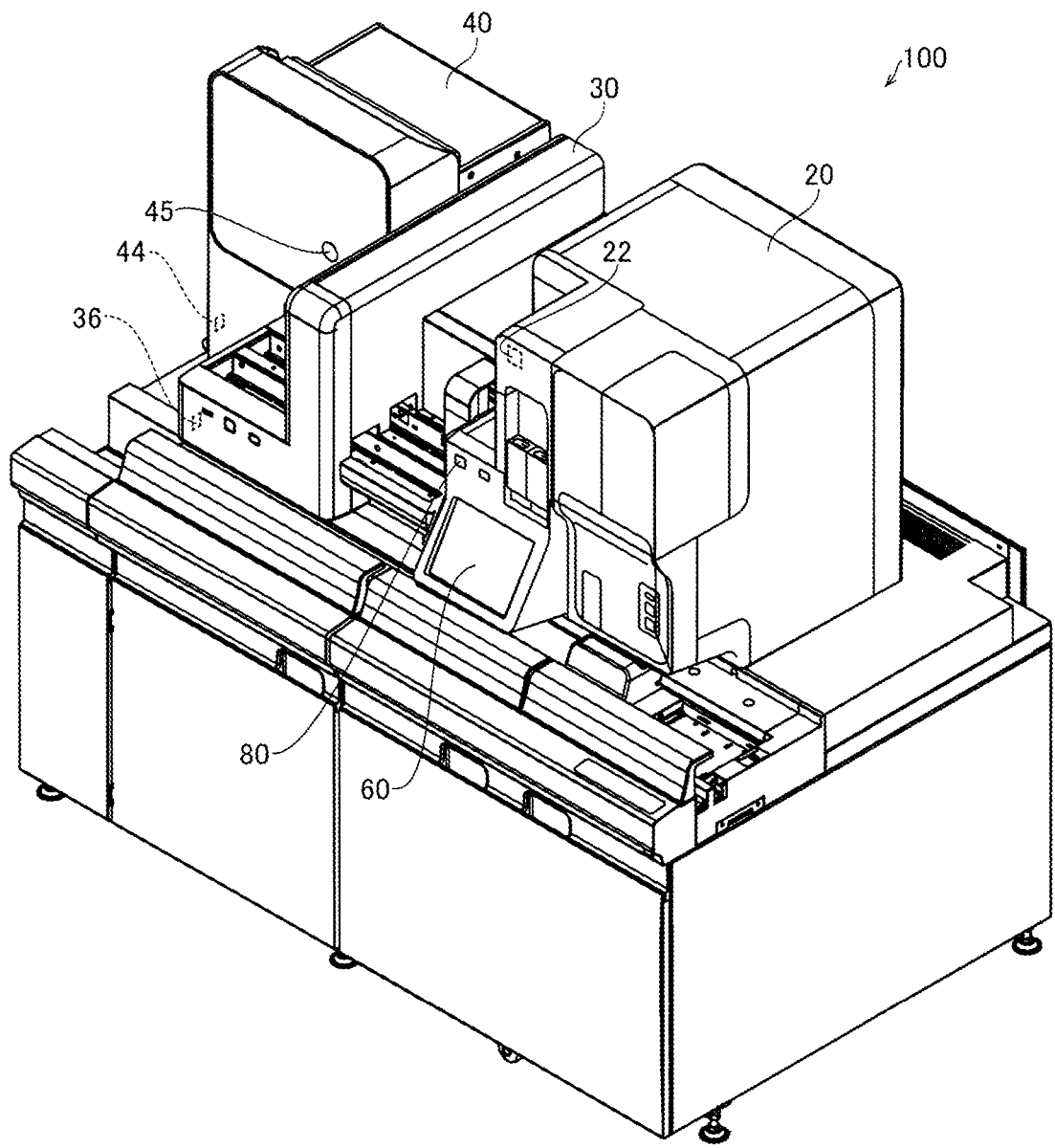
FIG. 3 is a perspective view illustrating an overview of a testing system.

As illustrated in FIG. 2, the testing system 100 includes the smear preparing apparatus 20, the smear transporting apparatus 30, and the smear image capturing apparatus 40. The smear preparing apparatus 20 includes a slide supplier 210, a printer 220, a smearing part 230, a dryer 240, a staining part 250, a magazine transporter 260, a fluid circuit 270, a communicator 21 (see FIG. 4), a master electrical switch 22 (see FIGS. 3 and 4), and a start switch 80 (see FIGS. 3 and 4). The smear transporting apparatus 30 includes a transporting mechanism 31, a magazine transporter 32, a magazine transporter 33, a camera 34 (see FIG. 4), communicators 35a and 35b (see FIG. 4), a master electrical switch 36 (see FIGS. 3 and 4), and an I/O substrate 37 (see FIG. 4). The smear image capturing apparatus 40 includes an image capturing part 41, a controller 42 (see FIG. 4), a communicator 43 (see FIG. 4), a master electrical switch 44 (see FIGS. 3 and 4), a start switch 45 (see FIGS. 3 and 4), an I/O substrate 46 (see FIG. 4), and a display part 47 (see FIG. 4). The testing system 100 is used for clinical tests, for example. The testing system 100 is installed in a hospital or a testing institution.

In the testing system 100, the smear slide 10 is prepared by the smear preparing apparatus 20. The smear slide 10 is supplied or transported to the smear image capturing apparatus 40 by the smear transporting apparatus 30. Then, the smear slide 10 undergoes image capturing by the smear image capturing apparatus 40 and an analysis is conducted thereon. The smear slide 10 after the image capturing is returned to and stored in the smear transporting apparatus 30. Using the smear preparing apparatus 20, the smear transporting apparatus 30, and the smear image capturing apparatus 40, the testing system 100 can automatically conduct the series of operations from preparation of the smear slide 10 on which the sample such as blood is smeared to the image capturing of the sample. Although the example of constructing the testing system 100 by separately providing the smear preparing apparatus 20, the smear transporting apparatus 30, and the smear image capturing apparatus 40 is illustrated herein, the testing system 100 may be constructed as an apparatus that integrates part or all of the smear preparing apparatus 20, the smear transporting apparatus 30, and the smear image capturing apparatus 40. For instance, the constructions of the respective apparatuses may be housed in a shared casing.

The smear preparing apparatus 20 is the apparatus that prepares the smear slide 10 by smearing the blood as the sample of the subject on a piece of glass slide and then providing treatments such as drying and staining thereto. The smear slide 10 may be formed from a plate material made of glass and having a rectangular shape, and the sample may be smeared on a central part thereof. A frosted portion serving as a printing area for identification information may be provided at an upper part that is one end portion in a longitudinal direction of the smear slide 10.

The slide supplier 210 of the smear preparing apparatus 20 houses numerous slides in an unused state prior to the smearing of samples thereon. Specifically, the slide supplier 210 includes the multiple slides before the treatments in a stacked state. That is to say, the slide supplier 210 can hold or retain the multiple slides in a vertically stacked manner. The slide supplier 210 can supply the glass slides before being smeared one by one.

The printer 220 prints a variety of information including sample information in the printing area on each slide. For example, the printer 220 prints information for identifying the sample, such as a sample number, date, a reception number, and a name of a subject in the printing area as the sample information. Moreover, the printer 220 prints the information in the printing area in the form of a barcode, characters, a symbol or the like. Furthermore, the printer 220 prints an identifier in the printing area on the glass slide, which indicates whether or not it is appropriate to capture an image of the prepared smear slide 10 by the smear image capturing apparatus 40. The identifier represents information for identifying whether or not the sample is targeted for the image capturing by the smear image capturing apparatus 40. The information as to whether or not the sample is targeted for the image capturing by the smear image capturing apparatus 40 or whether or not the sample is targeted for a visual examination with the microscope can be inputted to a host computer in advance at the time of reception of the test. The identifier is printed in the printing area in the form of a barcode, characters, a symbol or the like.

The smearing part 230 can smear the sample on the glass slide. Specifically, the smearing part 230 smears the sample in a smearing region on a surface of the glass slide. A smearing method (so-called a wedge smear method) using a smearing member such as a glass spreader, and other smearing methods can be employed on a smear treatment by the smearing part 230. The smearing part 230 conducts the smear treatment by using a smearing mechanism corresponding to the smearing method to be employed. Moreover, the smearing part 230 aspirates the sample by using a sample aspiration mechanism and smears the sample by dripping the sample in the smearing region on the glass slide.

The dryer 240 has a function to blow the air into the smearing region on the smear slide 10 smeared with the sample. The dryer 240 includes a fan. The dryer 240 can dry the sample smeared on the smear slide 10 by blowing the air with the fan.

The staining part 250 stains the smear slide 10 smeared by the smearing part 230 sequentially with different smearing solutions. Moreover, the staining part 250 cleans the smear slide 10 between the sequential staining with the different staining solutions. The staining part 250 includes a staining tank 251, a cleaning tank 252, and a drying tank 253. The staining tank 251 includes staining sub-tanks 251a, 251b, 251c, 251d, and 251e. The cleaning tank 252 includes cleaning sub-tanks 252a and 252b.

Each of the staining tank 251 and the cleaning tank 252 can hold or retain multiple smear slides 10. Moreover, each of the staining tank 251 and the cleaning tank 252 can transfer the smear slides 10 one by one between the tanks. Thus, the multiple smear slides 10 can be stained in parallel, so that the multiple smears can be efficiently prepared.

The staining sub-tank 251a can store or contain methanol. In the staining sub-tank 251a, the sample on the smear slide 10 after the smear treatment is fixed. Specifically, in the staining sub-tank 251a, the moisture in the sample is replaced with methanol.

The staining sub-tank 251b can store or contain a high-concentration staining solution. In the staining sub-tank 251b, the targeted smear is fixed by the high-concentration staining solution. For example, in the case of performing May-Giemsa staining, a high-concentration May-Grunwald solution is used in the staining sub-tank 251b. In the case of performing Wright-Giemsa staining, a high-concentration Wright solution is used in the staining sub-tank 251b. In the case of performing simple Wright staining, the high-concentration Wright solution is used in the staining sub-tank 251b.

The staining sub-tank 251c can store or contain a diluted staining solution. Cytoplasm is stained in the staining sub-tank 251c. For example, in the case of performing the May-Giemsa staining, a May-Grunwald solution diluted with a phosphoric acid buffer solution is used in the staining sub-tank 251c. In the case of performing the Wright-Giemsa staining, a Wright solution diluted with the phosphoric acid buffer solution is used in the staining sub-tank 251c. In the case of performing the simple Wright staining, the Wright solution diluted with the phosphoric acid buffer solution is used in the staining sub-tank 251c.

The cleaning sub-tank 252a can store or contain a diluted buffer solution. In the cleaning sub-tank 252a, the stained smear slide 10 is cleaned with the diluted buffer solution. The diluted phosphoric acid buffer solution is used as the diluted buffer solution, for example.

The staining sub-tanks 251d and 251e can store or contain a diluted staining solution. Moreover, nuclei are stained in the staining sub-tanks 251d and 251e. For example, in the case of performing the May-Giemsa staining, a Giemsa solution diluted with the phosphoric acid buffer solution is used in the staining sub-tanks 251d and 251e. In the case of performing the Wright-Giemsa staining, the Giemsa solution diluted with the phosphoric acid buffer solution is used in the staining sub-tanks 251d and 251e.

The cleaning sub-tank 252b can store or contain water. The stained smear slide 10 is cleaned in the cleaning sub-tank 252b.

The drying tank 253 dries each smear slide 10 stained in the staining tank 251 and cleaned in the cleaning tank 252. The drying tank 253 can hold or retain multiple smear slides 10. The air is sent into the drying tank 253 by the air blowing so as to dry the smear slides 10.

The magazine transporter 260 transports slide magazines 11 each capable of holding the multiple smear slides 10. The magazine transporter 260 includes a magazine import path 261 and a magazine export path 262. The magazine import path 261 can store multiple empty slide magazines 11. The magazine export path 262 can store the slide magazines 11 housing the smear slides 10. In the magazine transporter 260, when a user sets an empty slide magazine 11 on an input part of the magazine import path 261, the slide magazine 11 is automatically transported in a direction toward a smear housing position. Meanwhile, in the magazine transporter 260, each smear slide 10 taken out of the drying tank 253 of the staining part 250 is held in the slide magazine 11 at the smear housing position. Moreover, in the magazine transporter 260, the slide magazine 11 holding a predetermined number of the smear slides 10 is transported to an export position through the magazine export path 262.

The fluid circuit 270 is provided in order to supply and discharge the staining solutions and the cleaning solutions to and from the staining tank 251 and the cleaning tank 252. Moreover, the fluid circuit 270 is provided in order to supply the samples onto the glass slides.

The smear transporting apparatus 30 transports each smear slide 10. Specifically, the smear transporting apparatus 30 supplies the smear slide 10, which is supposed to undergo the image capturing by the smear image capturing apparatus 40, to the smear image capturing apparatus 40. Here, the smear slide 10 to undergo the image capturing by the smear image capturing apparatus 40 can be supplied from the smear preparing apparatus 20 to the smear transporting apparatus 30, and also be supplied to the smear transporting apparatus 30 by the user. The smear slides 10 in the state of being housed in the slide magazine 11 are supplied to the smear transporting apparatus 30. In the meantime, the smear transporting apparatus 30 takes the smear slides 10 targeted for the image capturing one by one out of the slide magazine 11 and supplies the smear slides 10 to the smear image capturing apparatus 40. On the other hand, the smear transporting apparatus 30 receives the smear slides 10 after the image capturing one by one from the smear image capturing apparatus 40, and puts the smear slides 10 into the slide magazine 11.

The transporting mechanism 31 includes a transporter 31a and a transporting shuttle 31b. The transporter 31a takes the smear slides 10 before the image capturing one by one out of the slide magazine 11, and delivers the smear slides 10 to the transporting shuttle 31b. In the meantime, the transporter 31a receives the smear slides 10 after the image capturing from the transporting shuttle 31b, and transports the smear slides into the slide magazine 11. Specifically, the transporter 31a takes each smear slide 10 out of the slide magazine 11 transported by the magazine transporter 32. Then, the transporter 31a transports the smear slide 10 to such a position that enables the camera 34 (see FIG. 4) to capture its image. An image of the printing area on the smear slide 10 is captured by the camera 34. Specifically, the camera 34 captures an image of the identifier that indicates the appropriateness to capture the image. The transporter 31a transports the smear slide 10 targeted for the image capturing by the smear image capturing apparatus 40 to the transporting shuttle 31b. In the meantime, the transporter 31a returns the smear slide 10 not targeted for the image capturing by the smear image capturing apparatus 40 back to the slide magazine 11 in the magazine transporter 32.

The transporter 31a receives each smear slide 10 after the image capturing by the smear image capturing apparatus 40 from the transporting shuttle 31b, and houses the smear slide 10 in another slide magazine 11 in the magazine transporter 33. That is to say, the smear slide 10 after the image capturing by the smear image capturing apparatus 40 is housed in the slide magazine 11 which is different from the one that houses the smear slides 10 before the image capturing and the smear slides 10 not targeted for the image capturing. Here, each slide magazine 11 to be supplied to the magazine transporter 32 and each slide magazine 11 to be supplied to the magazine transporter 33 may be made distinguishable from each other. For example, the slide magazine 11 to be supplied to the magazine transporter 32 and the slide magazine 11 to be supplied to the magazine transporter 33 may be of different colors, provided with different identifiers, or have different shapes. Thus, it is possible to separate the smear slides 10 carrying oil as a consequence of undergoing the image capturing by the smear image capturing apparatus 40 while using the oil from the smear slides 10 not carrying such oil.

The transporter 31a can approach the slide magazine 11 from above, pull out the smear slide 10 upward, and transport the smear slide 10. Meanwhile, the transporter 31a can approach the slide magazine 11 from above, insert the smear slide 10 from above, and put the smear slide 10 in the slide magazine 11.

The transporting shuttle 31b receives the smear slide 10 before the image capturing from the transporter 31a, and delivers the smear slide 10 to the smear image capturing apparatus 40. Meanwhile, the transporting shuttle 31b receives the smear slide 10 after the image capturing from the smear image capturing apparatus 40, and delivers the smear slide 10 to the transporter 31a. The transporting shuttle 31b includes a portion to hold or retain the smear slide 10 before the image capturing and a portion to hold the smear slide 10 after the image capturing, which are provided separately from each other. In this way, it is possible to transport the smear slides 10 carrying the oil as a consequence of undergoing the image capturing by the smear image capturing apparatus 40 while using the oil and the smear slides 10 not carrying the oil by using the separate portions, respectively.

The magazine transporter 32 includes a magazine importing part 32a, a slide delivering part 32b, and a magazine exporting part 32c. Moreover, the magazine transporter 32 comprises a sensor 32d. The magazine transporter 32 receives each slide magazine 11 that houses the smear slides 10 by using the magazine importing part 32a. The slide magazine 11 holding the smear slides 10 prepared by the smear preparing apparatus 20 is imported to or transported into the magazine importing part 32a. Alternatively, the slide magazine 11 holding the smear slides 10 targeted for the image capturing can be set to or in the magazine importing part 32a by the user. When the slide magazine 11 is set by the user, the slide magazine 11 is detected by the sensor 32d. As the slide magazine 11 is detected by the sensor 32d, the slide magazine 11 is transported by the magazine transporter 32. The sensor 32d is formed from an optical sensor provided with a light emitting part and a light receiving part, for example. The optical sensor may be a transmission-type sensor or a reflection-type sensor. The light may be visible light or non-visible light such as infrared rays. Meanwhile, the sensor 32d may be a sensor other than the optical sensor. For example, the sensor 32d may be a mechanical sensor. Meanwhile, the magazine transporter 32 transports the slide magazine 11 from the magazine importing part 32a to the slide delivering part 32b. Moreover, the magazine transporter 32 transports the slide magazine 11 from the slide delivering part 32b to the magazine exporting part 32c. The magazine transporter 32 transports the slide magazine 11 to the magazine exporting part 32c when all the smear slides 10 targeted for the image capturing by the smear image capturing apparatus 40 are taken out of the slide magazine 11 located at or in the slide delivering part 32b. The magazine exporting part 32c can store the multiple slide magazines 11 holding the smear slides 10.

The magazine transporter 33 includes a magazine importing part 33a, a slide delivering part 33b, and a magazine exporting part 33c. The magazine transporter 33 receives each empty slide magazine 11 by using the magazine importing part 33a. That is to say, the empty slide magazine 11 is set to or in the magazine importing part 33a by the user. Meanwhile, the magazine transporter 33 transports the slide magazine 11 from the magazine importing part 33a to the slide delivering part 33b. Moreover, the magazine transporter 33 transports the slide magazine 11 from the slide delivering part 33b to the magazine exporting part 33c. The magazine transporter 33 transports the slide magazine 11 to the magazine exporting part 33c when a predetermined number of the smear slides 10 after the image capturing by the smear image capturing apparatus 40 are housed in the slide magazine 11 located at or in the slide delivering part 33b. The magazine exporting part 33c can store the multiple slide magazines 11 holding the smear slides 10.

Each slide magazine 11 holding the smear slides 10 not subjected to the image capturing by the smear image capturing apparatus 40 is exported or transported to the magazine exporting part 32c of the magazine transporter 32. Each slide magazine 11 holding the smear slides 10 after the image capturing by the smear image capturing apparatus 40 is exported or transported to the magazine exporting part 33c of the magazine transporter 33.

The smear image capturing apparatus 40 captures an image of each smear slide 10 by using the image capturing part 41. Specifically, the smear image capturing apparatus 40 captures a blood cell image in terms of each smear slide 10 transported from the smear transporting apparatus 30. The smear image capturing apparatus 40 captures the image of the smear slide 10 by using immersion oil in order to obtain a clear image by increasing a numerical aperture. To be more precise, the immersion oil is dripped in an image capturing area of the smear slide 10 and the image of the image capturing area is captured by the image capturing part 41.

Figure 4:
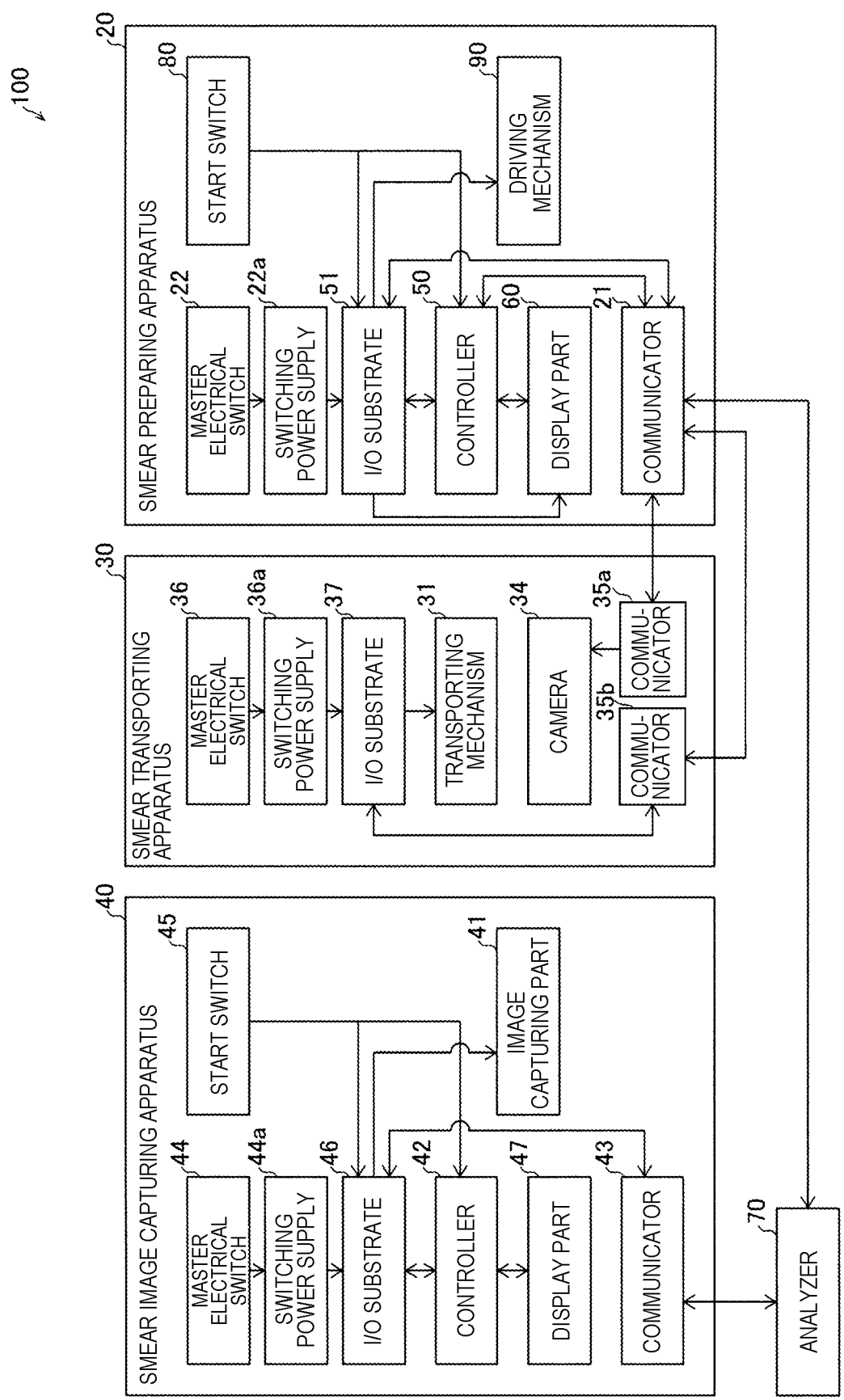
FIG. 4 is a block diagram illustrating a control configuration of a testing system.

A control configuration example of the testing system 100 is described with reference to FIG. 4.

The smear preparing apparatus 20 is provided with the controller 50, an I/O substrate 51, and the display part 60. The smear preparing apparatus 20 is also provided with the start switch 80. Moreover, the smear preparing apparatus 20 includes a driving mechanism 90. Furthermore, the smear preparing apparatus 20 includes the communicator 21. In addition, the smear preparing apparatus 20 includes the master electrical switch 22 and a switching power supply 22a. The smear transporting apparatus 30 includes the transporting mechanism 31, the camera 34, and the communicators 35a and 35b. Moreover, the smear transporting apparatus 30 includes the master electrical switch 36 and a switching power supply 36a. Furthermore, the smear transporting apparatus 30 includes the I/O substrate 37. The smear image capturing apparatus 40 includes the image capturing part 41, the controller 42, and the communicator 43. The smear image capturing apparatus 40 also includes the master electrical switch 44, a switching power supply 44a, and the start switch 45. Moreover, the smear image capturing apparatus 40 includes the I/O substrate 46 and the display part 47. In addition, an analyzer 70 is connected to the smear image capturing apparatus 40.

The controller 50 and the communicator 21 of the smear preparing apparatus 20 are mounted on a CPU board and an I/O board, for example.

The driving mechanism 90 including a motor, a sensor, a valve, and the like is connected to the I/O board of the smear preparing apparatus 20. The driving mechanism 90 including the motor, the sensor, the valve, and the like is connected to an I/O board of the smear transporting apparatus 30.

The controller 50 can control the start-up operation of the smear transporting apparatus 30. Specifically, the communicator 21 of the smear preparing apparatus 20 is communicably connected to the communicators 35a and 35b of the smear transporting apparatus 30. The communicator 21 is connected to the communicators 35a and 35b by wire. The communicator 21 is connected to the communicators 35a and 35b in accordance with the USB standard, for example. Here, the communicator 21 may be communicably connected to the communicators 35a and 35b by air or wirelessly. In the meantime, the controller 50 of the smear preparing apparatus 20 can communicate with the controller 42 of the smear image capturing apparatus 40. Specifically, the communicator 21 of the smear preparing apparatus 20 is communicably connected to the communicator 43 of the smear image capturing apparatus 40. The communicator 21 is connected to the communicator 43 by wire. The communicator 21 is connected the communicator 43 through a LAN, for example. Here, the communicator 21 may be communicably connected to the communicator 43 by air or wirelessly.

The controller 50 of the smear preparing apparatus 20 can communicate with a transport controller provided in the smear transporting apparatus 30. Specifically, the communicator 21 of the smear preparing apparatus 20 is communicably connected to the communicator 35b of the smear transporting apparatus 30.

The master electrical switch 22 is a switch for turning on power distribution to the smear preparing apparatus 20. For instance, the master electrical switch 22 is a physical switch which the user can manipulate or operate. Examples of the master electrical switch 22 include a push-button switch, a toggle switch, a rocker switch, and the like.

When the master electrical switch 22 is turned on, electric power is supplied from a general power supply to the I/O substrate 51. In this case, a portion of maximum electric power is supplied to the I/O substrate 51. The switching power supply 22a transforms alternating-current power supplied from the general power supply into direct-current power, and supplies the power to the I/O substrate 51. Specifically, the switching power supply 22a is started when the master electrical switch 22 is turned on. Moreover, after the start-up, the switching power supply 22a transforms the alternating-current power supplied from the general power supply into the direct-current power, and supplies the power to the I/O substrate 51. When the master electrical switch 22 is turned off, the power supply to the I/O substrate 51 is shut off.

The I/O substrate 51 is connected to the controller 50, the display part 60, the driving mechanism 90, and the communicator 21. The I/O substrate 51 can supply the power to the controller 50, the display part 60, the driving mechanism 90, and the communicator 21. Moreover, the I/O substrate 51 can communicate signals to the controller 50, the display part 60, the driving mechanism 90, and the communicator 21.

The start switch 80 is manipulated or operated to set out or start the start-up operations of the smear preparing apparatus 20 and the smear transporting apparatus 30. For instance, the start switch 80 is a physical switch which the user can manipulate or operate. Examples of the start switch 80 include a push-button switch, a toggle switch, a rocker switch, and the like.

When the start switch 80 is turned on in the on-state of the master electrical switch 22, a start signal is transmitted to the I/O substrate 51 through the controller 50. By the intermediary of the communicators 21 and 35b, the controller 50 determines whether or not the master electrical switch 36 of the smear transporting apparatus 30 is turned on. When the master electrical switch 36 is on, the controller 50 causes the display part 60 to display a selection screen (see FIGS. 5 and 6). On the other hand, when the master electrical switch 36 is off, the controller 50 causes the display part 60 to display an error notification (see FIG. 7).

The communicators 35a and 35b of the smear transporting apparatus 30 are mounted on the I/O board, for example.

The camera 34 of the smear transporting apparatus 30 is connected to the controller 50 of the smear preparing apparatus 20 through the communicators 35a and 21. The camera 34 performs image capturing operations under the control of the controller 50. Meanwhile, a captured image is transmitted to the controller 50 and is subjected to processing by the controller 50.

The master electrical switch 36 is a switch for turning on power distribution to the smear transporting apparatus 30. For instance, the master electrical switch 36 is a physical switch which the user can manipulate or operate. Examples of the master electrical switch 36 include a push-button switch, a toggle switch, a rocker switch, and the like.

When the master electrical switch 36 is turned on, the electric power is supplied from the general power supply to the I/O substrate 37. In this case, a portion of the maximum electric power is supplied to the I/O substrate 37. The switching power supply 36a transforms the alternating-current power supplied from the general power supply into the direct-current power, and supplies the power to the I/O substrate 37. Specifically, the switching power supply 36a is started when the master electrical switch 36 is turned on. Moreover, after the start-up, the switching power supply 36a transforms the alternating-current power supplied from the general power supply into the direct-current power, and supplies the power to the I/O substrate 37. When the master electrical switch 36 is turned off, the power supply to the I/O substrate 37 is shut off.

The I/O substrate 37 is connected to the transporting mechanism 31 and the communicator 35b. The I/O substrate 37 can supply the power to the transporting mechanism 31 and the communicator 35b. Moreover, the I/O substrate 37 can communicate signals to the transporting mechanism 31 and the communicator 35b. Meanwhile, the I/O substrate 37 is connected to the controller 50 of the smear preparing apparatus 20 through the communicators 35b and 21. The controller 50 controls operations of the transporting mechanism 31 through the I/O substrate 37.

The controller 42 of the smear image capturing apparatus 40 includes a CPU and a memory, for example. Moreover, the communicator 43 is provided in an I/O board, for example. The image capturing part 41 includes the microscope and the camera. Meanwhile, the analyzer 70 executes the image processing, the classification processing, and the like on the image captured by the image capturing part 41. The image capturing by the smear image capturing apparatus 40 is ended when the analyzer 70 obtains prescribed data.

The master electrical switch 44 is a switch for turning on power distribution to the smear image capturing apparatus 40. For instance, the master electrical switch 44 is a physical switch which the user can manipulate or operate. Examples of the master electrical switch 44 include a push-button switch, a toggle switch, a rocker switch, and the like.

When the master electrical switch 44 is turned on, the electric power is supplied from the general power supply to the I/O substrate 46. In this case, a portion of the maximum electric power is supplied to the I/O substrate 46. The switching power supply 44a transforms the alternating-current power supplied from the general power supply into the direct-current power, and supplies the power to the I/O substrate 46. Specifically, the switching power supply 44a is started when the master electrical switch 44 is turned on. Moreover, after the start-up, the switching power supply 44a transforms the alternating-current power supplied from the general power supply into the direct-current power, and supplies the power to the I/O substrate 46. When the master electrical switch 44 is turned off, the power supply to the I/O substrate 46 is shut off.

The start switch 45 is manipulated or operated to set out or start the start-up operation of the smear image capturing apparatus 40. For instance, the start switch 45 is a physical switch which the user can manipulate or operate. Examples of the start switch 45 include a push-button switch, a toggle switch, a rocker switch, and the like.

The controller 42 is started when the start switch 45 is turned on in the on-state of the master electrical switch 44. Then, the controller 42 controls a start-up operation of the smear image capturing apparatus 40.

The I/O substrate 46 is connected to the image capturing part 41, the controller 42, and the communicator 43. The I/O substrate 46 can supply the power to the image capturing part 41, the controller 42, and the communicator 43. Moreover, the I/O substrate 46 can communicate signals to the image capturing part 41, the controller 42, and the communicator 43.

The display part 47 performs display for the manipulation or operation of the smear image capturing apparatus 40, display of a condition of the smear image capturing apparatus 40, and the like. The display part 47 includes a liquid crystal display, an organic EL display, and the like. Moreover, the display part 47 is provided with a touch panel so that the display part 47 can accept manipulation or operation by the user.

The controller 50 controls the operations of the multiple apparatuses out of the smear preparing apparatus 20, the smear image capturing apparatus 40, and the smear transporting apparatus 30. In the configuration example illustrated in FIG. 4, the controller 50 controls the operations of the smear preparing apparatus 20 and the smear image capturing apparatus 40. Here, the common controller 50 may be provided in the smear preparing apparatus 20 while the transport controller is not provided in the smear transporting apparatus 30. In this way, the controller 50 can control the operations of the multiple apparatuses, and it is therefore not necessary to provide the controller to every apparatus. Thus, it is possible to simplify the apparatus configuration and to reduce the number of components.

The controller 50 performs the control to set out the start-up operations of the multiple apparatuses or the single apparatus out of the smear preparing apparatus 20, the smear image capturing apparatus 40, and the smear transporting apparatus 30 based on a selection on the selection screen (see FIGS. 5 and 6) of the display part 60. Thus, it is possible to set out the start-up operations of the multiple apparatuses or the single apparatus out of the smear preparing apparatus 20, the smear image capturing apparatus 40, and the smear transporting apparatus 30. Accordingly, expendables such as the staining solutions for preparing the smear need not be arranged when the smear preparing apparatus 20 is not used, for example. Hence, it is possible to keep the expendables from being wasted.

That is to say, the controller 50 is provided in the smear preparing apparatus 20 and is configured to control the operations of the smear preparing apparatus 20 and the smear transporting apparatus 30, and to perform control to start up the smear preparing apparatus 20 and the smear transporting apparatus 30 based on the selection on the selection screen (see FIG. 5) of the display part 60. In this way, the smear transporting apparatus 30 does not have to be provided with the controller. Accordingly, it is possible to simplify the apparatus configuration and to reduce the number of components. Moreover, the controller 50 provided in the smear preparing apparatus 20 can set out the start-up operations of the smear preparing apparatus 20 and the smear transporting apparatus 30.

Based on the selection on the selection screen (see FIG. 6) of the display part 60, the controller 50 selectively conducts any of the start-up operations of the smear preparing apparatus 20 as well as the smear transporting apparatus 30 and the start-up operation of the smear transporting apparatus 30. Thus, corresponding to both the operation to prepare and transport the smear slide 10 and the operation to transport and capture the image of the smear slide 10 it is possible to set out the start-up operations of the single apparatus or the multiple apparatuses.

The controller 50 performs control to introduce the staining solutions to or into the staining part 250 in the case of performing the start-up operation of the smear preparing apparatus 20 when the smear preparing apparatus 20 is selected on the selection screen of the display part 60. Thus, no staining solutions are introduced to or into the staining part 250 when the smear preparing apparatus 20 is not used. This makes it possible to efficiently keep the staining solutions from being wasted.

The controller 50 performs control to clean the smearing part 230 in the case of performing the start-up operation of the smear preparing apparatus 20 when the smear preparing apparatus 20 is selected on the selection screen of the display part 60. Thus, the smearing part 230 is cleaned even when a foreign substance attaches to the smearing part 230 during an inactive period, so that the foreign substance can be removed from the smearing part 230. This makes it possible to conduct the smearing in good condition.

The controller 50 performs control to clean the fluid circuit 270 in the case of performing the start-up operation of the smear preparing apparatus 20 when the smear preparing apparatus 20 is selected on the selection screen of the display part 60. Specifically, in the case of performing the start-up operation of the smear preparing apparatus 20, the fluid circuit that is configured to aspirate the sample and to supply the sample onto the glass slide is cleaned with a cleaning agent. For example, a sodium hypochlorite aqueous solution is used as the cleaning agent. Thus, the cleaning agent is not introduced to or into the fluid circuit 270 when the smear preparing apparatus 20 is not used. This makes it possible to effectively keep the cleaning agent from being wasted. Here, the smear preparing apparatus 20 may clean at least one of the smearing part 230 and the fluid circuit 270 as the start-up operation.

In the meantime, the controller 50 performs control to initialize the driving mechanism 90 in the case of performing the start-up operation of the smear preparing apparatus 20 when the smear preparing apparatus 20 is selected on the selection screen of the display part 60. Thus, it is possible to activate the driving mechanism 90 at high accuracy since the driving mechanism 90 is initialized in the case of using the smear preparing apparatus 20.

The controller 50 performs control to initialize the driving mechanism 90 in the case of performing the start-up operation of the smear transporting apparatus 30 when the smear transporting apparatus 30 is selected on the selection screen of the display part 60. In the meantime, the controller 50 performs control to cause the controller 42 to initialize the driving mechanism 90 in the case of performing the start-up operation of the smear image capturing apparatus 40 when the smear image capturing apparatus 40 is selected on the selection screen of the display part 60. That is to say, the controller 42 initializes the driving mechanism 90 and performs the start-up operation of the smear image capturing apparatus 40 based on an end instruction from the controller 50.

The controller 50 and the controller 42 are made communicable to each other, and control the multiple apparatuses in cooperation. In the configuration example illustrated in FIG. 4, the controller 50 controls the smear preparing apparatus 20 and the smear transporting apparatus 30 while the controller 42 controls the smear image capturing apparatus 40. Meanwhile, the controller 50 and the controller 42 control the smear preparing apparatus 20, the smear transporting apparatus 30, and the smear image capturing apparatus 40 in cooperation. Thus, it is possible to smoothly perform the treatments on the smear slide 10 by bringing the multiple apparatuses into cooperation.

The controller 50, the controller 42, and the transport controller are made communicable to one another, and control the multiple apparatuses in cooperation. For example, the controller 50, the controller 42, and the transport controller perform processing for preparing, transporting, and capturing the image of the smear slide 10 in cooperation. The controller 50, the controller 42, and the transport controller perform transfer control of the smear slide 10 in cooperation in the case of delivery of the smear slide 10 among the smear preparing apparatus 20, the smear image capturing apparatus 40, and the smear transporting apparatus 30.

The controller 50 causes the display part 60 to display an end selection screen (see FIG. 8) allowing selection of ending of activities, and performs control to end the activities after the end of the operations of the apparatuses based on the selection. Thus, even when the manipulation or operation to end the activities of the apparatuses in operation takes place, it is possible to wait to end the activities until the operations are ended. Moreover, it is possible to manipulate or operate the ending of the activities of the multiple apparatuses in a lump based on the end selection screen of the display part 60. Thus, it is possible to enhance operability at the time of ending the activities of the apparatuses in the testing system 100.

The controller 50 controls the operations of the multiple apparatuses out of the smear preparing apparatus 20, the smear image capturing apparatus 40, and the smear transporting apparatus 30, and performs control to end the activities of the apparatuses after the end of the operations of the apparatuses based on the selection on the end selection screen of the display part 60. In this way, the controller 50 can control the operations of the multiple apparatuses and it is therefore not necessary to provide the controller to every apparatus. Thus, it is possible to simplify the apparatus configuration and to reduce the number of components. In addition, it is possible to end the activities of the smear preparing apparatus 20, the smear image capturing apparatus 40, and the smear transporting apparatus 30 easily by the manipulation or operation based on the end selection screen of the display part 60.

When ending the activities of the smear preparing apparatus 20 and the smear transporting apparatus 30, the controller 50 performs control to end the activity of the smear preparing apparatus 20 after the end of the operation of the smear preparing apparatus 20, and then performs control to end the activity of the smear transporting apparatus 30. In this way, the smear preparing apparatus 20 can be kept from ending its activity in the course of the operation. Thus, it is possible to end the activity of the smear preparing apparatus 20 after the smear slide 10 is finished or prepared. Moreover, since it is possible to keep the smear transporting apparatus 30 from ending its activity when the smear preparing apparatus 20 is active, the finished or prepared smear slide 10 can be reliably delivered to the smear transporting apparatus 30.

When ending the activity of the smear preparing apparatus 20, the controller 50 performs control to discharge the staining solutions from the staining part 250. In this way, it is possible to empty the staining part 250 of the staining solutions when ending the activity of the smear preparing apparatus 20. Thus, the staining part 250 can be kept from being left for a long period in the state of storing the staining solutions.

When ending the activity of the smear preparing apparatus 20, the controller 50 performs control to clean the smearing part 230. In this way, the smearing part 230 is cleaned even when a foreign substance attaches to the smearing part 230, so that the foreign substance can be removed from the smearing part 230. Thus, it is possible to keep such a foreign substance from adhering to the smearing part 230 during an inactive period.

When ending the activity of the smear preparing apparatus 20, the controller 50 performs control to clean the fluid circuit 270. Specifically, when ending the activity of the smear preparing apparatus 20, the fluid circuit configured to aspirate the sample and to supply the sample onto the glass slide is cleaned with the cleaning agent. For example, the sodium hypochlorite aqueous solution is used as the cleaning agent. Thus, the fluid circuit 270 is cleaned even when a foreign substance attaches to the fluid circuit 270, so that the foreign substance can be removed from the fluid circuit 270. Thus, it is possible to keep such a foreign substance from adhering to the fluid circuit 270 during an inactive period. Here, the smear preparing apparatus 20 may clean at least one of the smearing part 230 and the fluid circuit 270 when ending the activity.

When ending the activity of the smear preparing apparatus 20, the controller 50 performs control to initialize the driving mechanism 90. Thus, it is possible to maintain driving accuracy of the driving mechanism 90 since the driving mechanism 90 is initialized when ending the activity of the smear preparing apparatus 20.

When ending the activity of the smear transporting apparatus 30, the controller 50 performs control to initialize the driving mechanism 90. In the meantime, when ending the activity of the smear image capturing apparatus 40, the controller 50 performs control to cause the controller 42 to initialize the driving mechanism 90. That is to say, based on a start-up instruction from the controller 50, the controller 42 initializes the driving mechanism 90 and then ends the activity of the smear image capturing apparatus 40.

The controller 50 performs control to cause the display part 60 to display the relevant apparatuses, of which the master electrical switches 22, 36, and 44 are on, as targets for selection on the selection screen. Specifically, the controller 50 causes the display part 60 to display the selection screen when the master electrical switches 22 and 36 of the smear preparing apparatus 20 and the smear transporting apparatus 30 are turned on, respectively. Thus, when the master electrical switches 22 and 36 are on at the start-up of the respective apparatuses, the user can select the setout of the start-up operation on the selection screen, so that it is possible to easily start the apparatus to use.

When the master electrical switches 22 and 36 of the smear preparing apparatus 20 and the smear transporting apparatus 30 are on, respectively, the controller 50 performs control to cause the display part 60 to display the selection screen on grounds that the start switch 80 is turned on. Thus, it is possible to select the apparatus to use by manipulating or operating the start switch 80. Accordingly, the start-up operation of the apparatus to use can be set out at a desired timing.

When at least one of the master electrical switches 22 and 36 of the smear preparing apparatus 20 and the smear transporting apparatus 30 is off, the controller 50 performs control to cause the display part 60 to display the error notification (see FIG. 7) when the start switch 80 is turned on. In this way, the error notification is displayed even in the case of forgetting to turn on any of the master electrical switches 22 and 36.

Thus, it is possible to reduce the chance of forgetting to perform the start-up manipulation or operation.

Specifically, when the master electrical switch 22 of the smear preparing apparatus 20 is on and the master electrical switch 36 of the smear transporting apparatus 30 is on, the controller 50 performs control to cause the display part 60 to display the selection screen on grounds that the start switch 80 is turned on. On the other hand, when the master electrical switch 22 of the smear preparing apparatus 20 is on and the master electrical switch 36 of the smear transporting apparatus 30 is off, the controller 50 performs control to cause the display part 60 to display the error notification on grounds that the start switch 80 is turned on.

Figure 5:
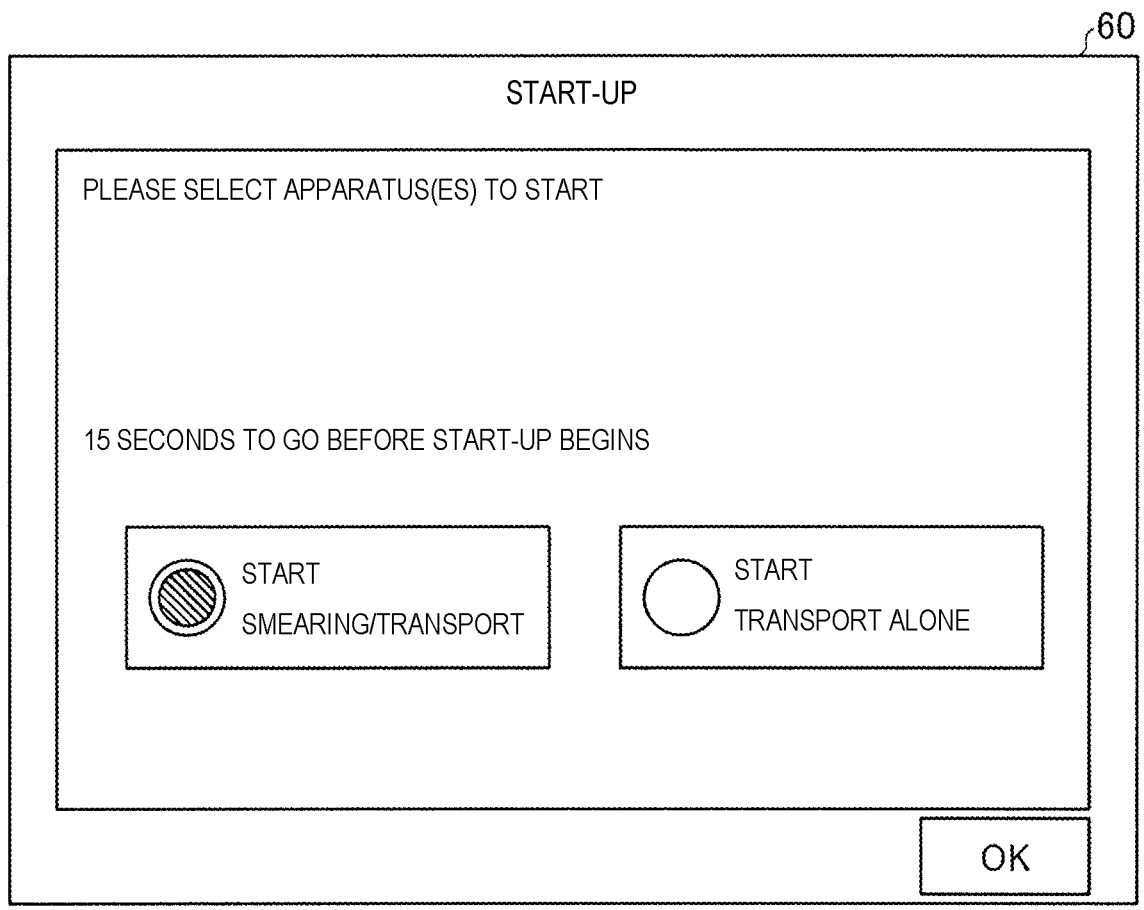
FIG. 5 is a diagram illustrating a first display example of a display part.
Figure 6:
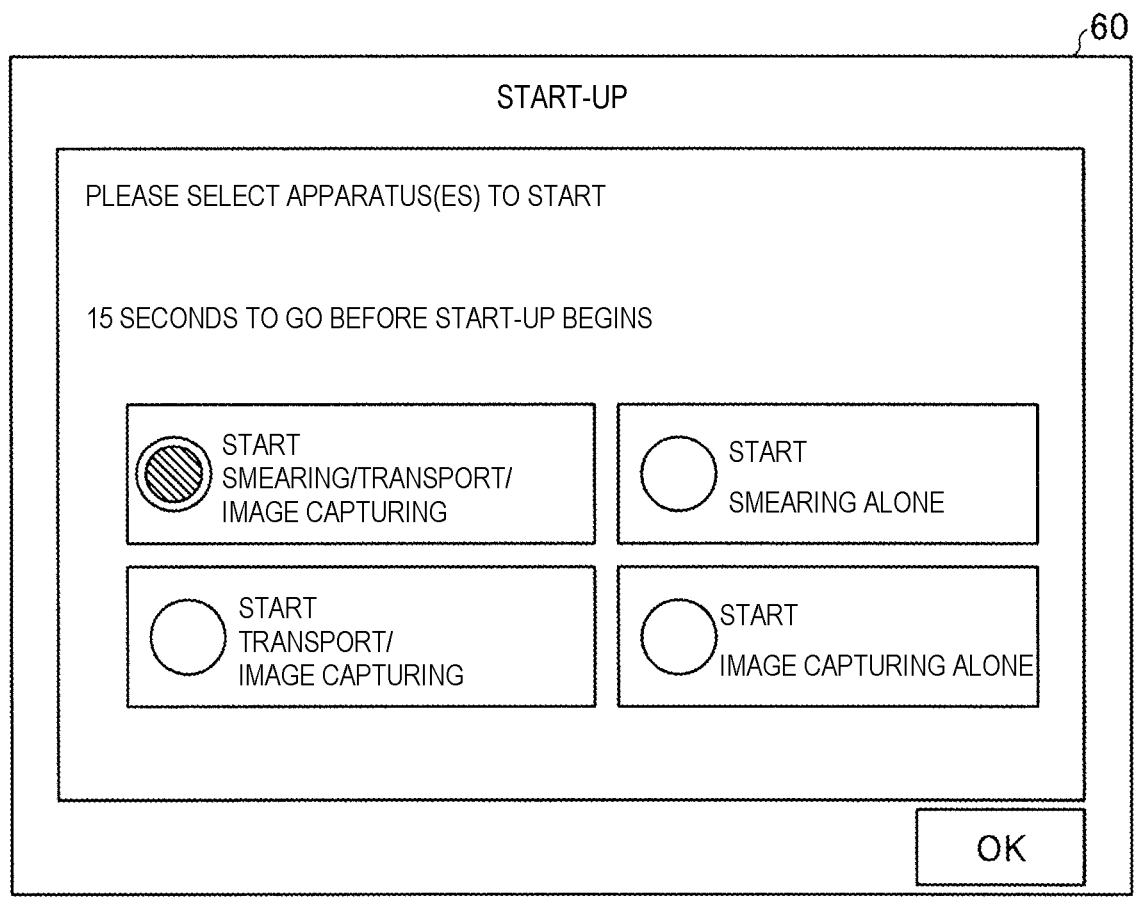
FIG. 6 is a diagram illustrating a second display example of a display part.

Here, the controller 50 may perform control to cause the display part 60 to display the selection screen as illustrated in FIGS. 5 and 6 when the start switch 80 is turned on. Specifically, when the power supply to the smear preparing apparatus 20 is turned on and the controller 50 is started, the controller 50 causes the display part 60 to display the selection screen for setting out the start-up operations. In this way, at the start-up of the controller 50, the user can select the apparatuses to prepare by using the selection screen, and thus to set out the start-up operations of the apparatuses to use.

Alternatively, the controller 50 may perform control to set out the start-up operations of the multiple apparatuses or the single apparatus based on the selection on the selection screen of the display part 60. In this way, at the start-up of the controller 50, it is possible to set out the start-up operations of the apparatus or apparatuses to use based on the user's selection on the selection screen.

In the example illustrated in FIG. 5, an option to select the start-up of the smear preparing apparatus 20 and the smear transporting apparatus 30 and an option to select the start-up of the smear transporting apparatus 30 alone are displayed on the selection screen. On the other hand, in the example illustrated in FIG. 6, an option to select the start-up of the smear preparing apparatus 20, the smear transporting apparatus 30, and the smear image capturing apparatus 40, an option to select the start-up of the smear preparing apparatus 20 alone, an option to select the start-up of the smear transporting apparatus 30 and the smear image capturing apparatus 40, and an option to select the start-up of the smear image capturing apparatus 40 alone are displayed on the selection screen.

The controller 50 sets out the start-up operation of the smear preparing apparatus 20 by causing an embedded control program to drive the driving mechanism 90 of the smear preparing apparatus 20 through the I/O board. The start-up operation of the smear preparing apparatus 20 includes self-check on a mechanical part, the fluid circuit 270, and the like. Moreover, the start-up operation of the smear preparing apparatus 20 includes an action to clean the fluid circuit 270, and an action to prepare a reagent and fill the staining part 250 with the reagent.

The controller 50 sets out the start-up operation of the smear transporting apparatus 30 by causing an embedded control program to drive the driving mechanism 90 of the smear transporting apparatus 30 through the communicator 35b. The start-up operation of the smear transporting apparatus 30 includes self-check on a mechanical section. Meanwhile, when the start-up of the smear transporting apparatus 30 alone is selected, the start-up operation is not conducted on the smear preparing apparatus 20, and the controller 50 transitions to a log-on dialogue screen. By performing a log-on manipulation or operation as needed, it is possible to conduct the start-up operation on the smear preparing apparatus 20 as well, and thus to establish a standby state thereof.

Here, if none of the options is selected within a predetermined period of time after the selection screen is displayed on the display part 60, then the start-up operation of a predetermined apparatus is set out on the assumption that the option corresponding to the predetermined apparatus is selected. In this way, it is possible to prevent a failure to set out the start-up operation of the apparatus because of forgetting to make the selection. For instance, if the option to select the start-up of the smear transporting apparatus 30 alone is not selected in the example of FIG. 5, the start-up operations are set out on the assumption that the option to select the start-up of the smear preparing apparatus 20 and the smear transporting apparatus 30 is selected.

As illustrated in FIG. 8, the controller 50 performs control to cause the display part 60 to display the end selection screen allowing selection of ending of the testing system 100. When a shutdown button is manipulated or operated as an action to select the ending, the controller 50 shuts down the testing system 100. In this case, the controller 50 may shut down the smear preparing apparatus 20, the smear transporting apparatus 30, and the smear image capturing apparatus 40, or shut down the smear preparing apparatus 20 and the smear transporting apparatus 30.

When the controller 50 shuts down the smear preparing apparatus 20 and the smear transporting apparatus 30, the controller 50 controls shutdown operations of the respective apparatuses as illustrated in FIG. 9. As the shutdown operation of the smear preparing apparatus 20, the controller 50 conducts a cleaning action and a mechanism initializing action. Meanwhile, as the shutdown operation of the smear transporting apparatus 30, the controller 50 conducts a magazine discharging action and a mechanism initializing action. In the magazine discharging action, the slide magazine 11 located at or in the slide delivering part 33b is discharged to the magazine exporting part 33c even when the slide magazine 11 is not full. Thus, it is possible to keep the smear slides 10 after the image capturing from being left in the slide delivering part 33b.

The controller 50 waits for the ending of the operations of both the smear preparing apparatus 20 and the smear transporting apparatus 30 and then turns off the power supply.

For example, when both the smear preparing apparatus 20 and the smear transporting apparatus 30 are not in operation but are in a standby state, shutdown operations of the respective apparatuses are executed by using a control program in the controller 50. Meanwhile, when the smear preparing apparatus 20 is in a standby state and the smear transporting apparatus 30 is in operation, a shutdown operation of the smear preparing apparatus 20 is set out whereas a shutdown operation of the smear transporting apparatus 30 is not set out until the smear transporting apparatus 30 ends its operation and transitions to a standby state. Then, the shutdown operation of the smear transporting apparatus 30 is set out when the standby state of the smear transporting apparatus 30 is detected. On the other hand, when the smear preparing apparatus 20 is in operation and the smear transporting apparatus 30 is in a standby state, none of the apparatuses is shut down immediately because, in spite of being in the standby state, a transporting operation takes place soon after the work-in-progress smear is prepared. The shutdown operations of the smear preparing apparatus 20 and the smear transporting apparatus 30 are set out after the respective apparatuses complete the operations and transition to a standby state.

When the operations of the smear transporting apparatus 30 and the smear image capturing apparatus 40 are set out, the controller 50 performs control to cause the magazine transporter 32 to transport the slide magazine 11 on grounds that the sensor 32d detects the slide magazine 11. According to this configuration, even in the case of not using the smear preparing apparatus 20, it is possible to capture the image of the smear slide 10 with the smear image capturing apparatus 40 by setting the slide magazine 11 to the smear transporting apparatus 30.

An apparatus starting process by the controller 50 is described with reference to FIG. 10.

Figure 10:
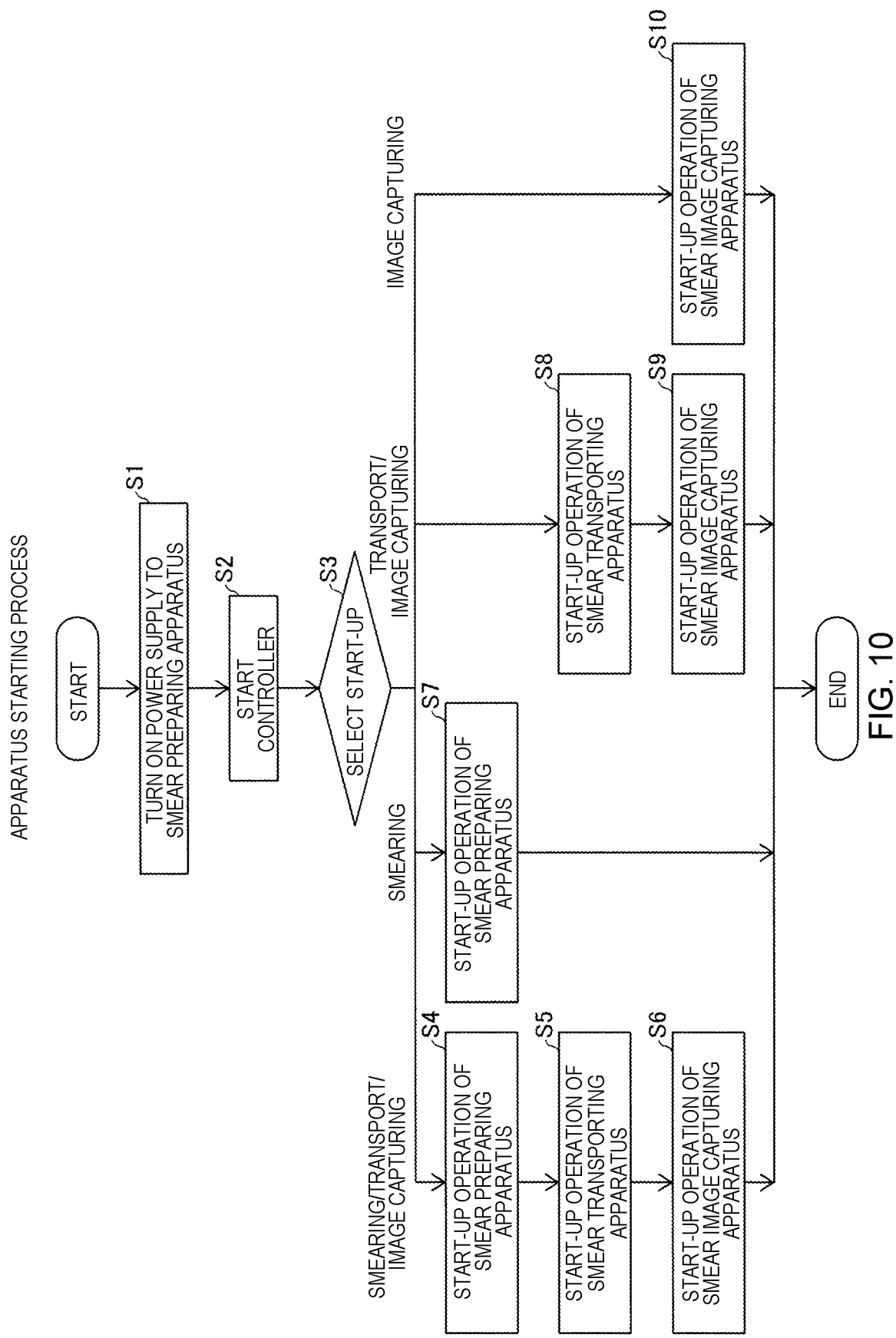
FIG. 10 is a flowchart illustrating an apparatus starting process.

When the power supply to the smear preparing apparatus 20 is turned on in step S1 of FIG. 10, the controller 50 is started in step S2. When the controller 50 is started, the controller 50 performs control to cause the display part 60 to display the selection screen that allows selection of the start-up of the respective apparatuses in step S3.

When the option to select the start-up of the smear preparing apparatus 20, the smear transporting apparatus 30, and the smear image capturing apparatus 40 is selected in step S3, the controller 50 conducts a start-up operation of the smear preparing apparatus 20 in step S4. Then, the controller 50 conducts a start-up operation of the smear transporting apparatus 30 in step S5. Meanwhile, the controller 50 transmits an instruction to the controller 42 and performs control to cause the controller 42 to conduct the start-up operation of the smear image capturing apparatus 40 in step S6. Thereafter, the controller 50 terminates the apparatus starting process.

When the option to select the start-up of the smear preparing apparatus 20 is selected in step S3, the controller 50 conducts the start-up operation of the smear preparing apparatus 20 in step S7. Thereafter, the controller 50 terminates the apparatus starting process.

When the option to select the start-up of the smear transporting apparatus 30 and the smear image capturing apparatus 40 is selected in step S3, the controller 50 conducts the start-up operation of the smear transporting apparatus 30 in step S8. Meanwhile, the controller 50 transmits the instruction to the controller 42 and performs control to cause the controller 42 to conduct the start-up operation of the smear image capturing apparatus 40 in step S9. Thereafter, the controller 50 terminates the apparatus starting process.

When the option to select the start-up of the smear image capturing apparatus 40 is selected in step S3, the controller 50 transmits the instruction to the controller 42 and performs control to cause the controller 42 to conduct the start-up operation of the smear image capturing apparatus 40 in step S10. Thereafter, the controller 50 terminates the apparatus starting process.

An apparatus ending process by the controller 50 is described with reference to FIG. 11.

Figure 11:
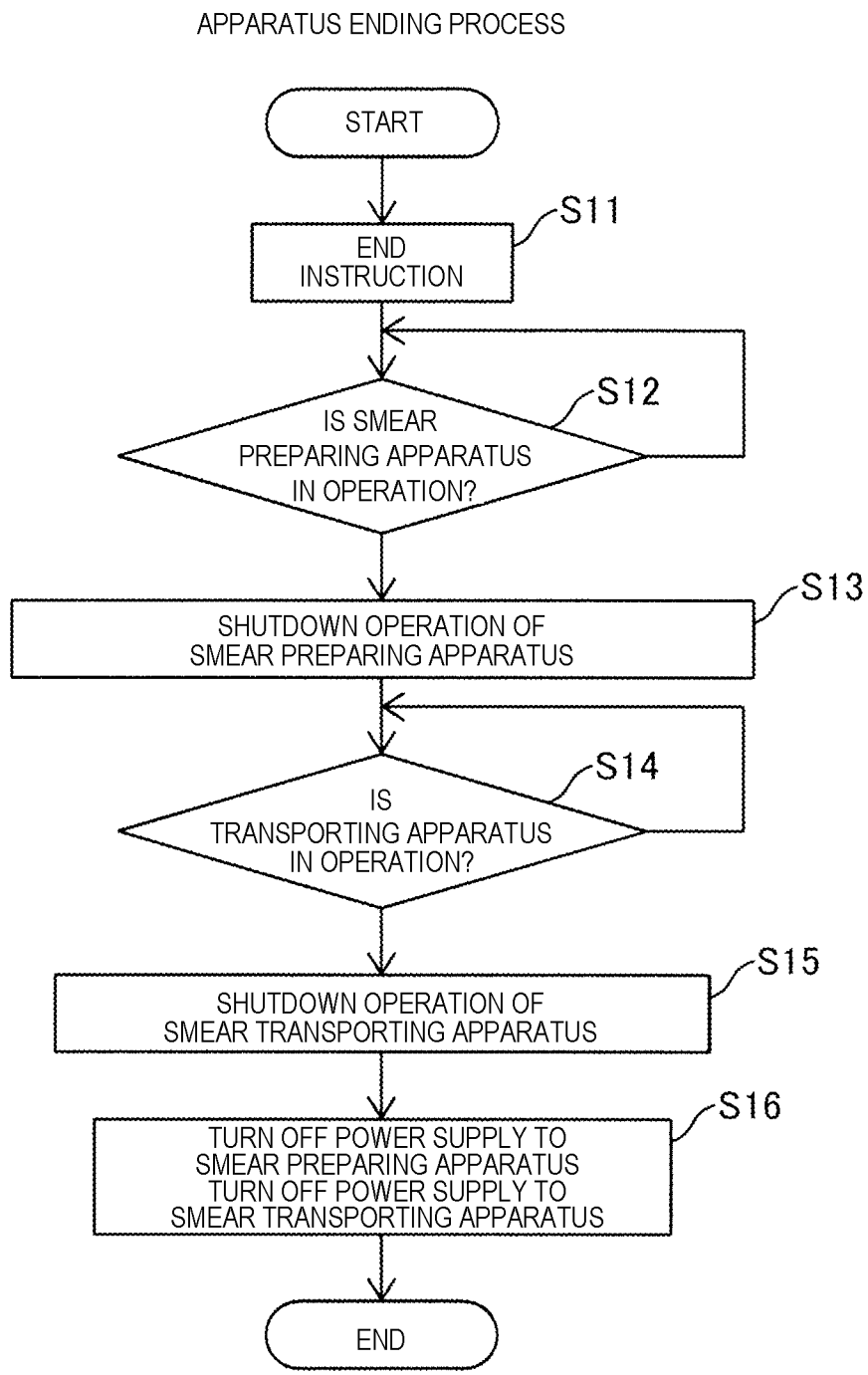
FIG. 11 is a flowchart illustrating an apparatus ending process.
Figure 12:
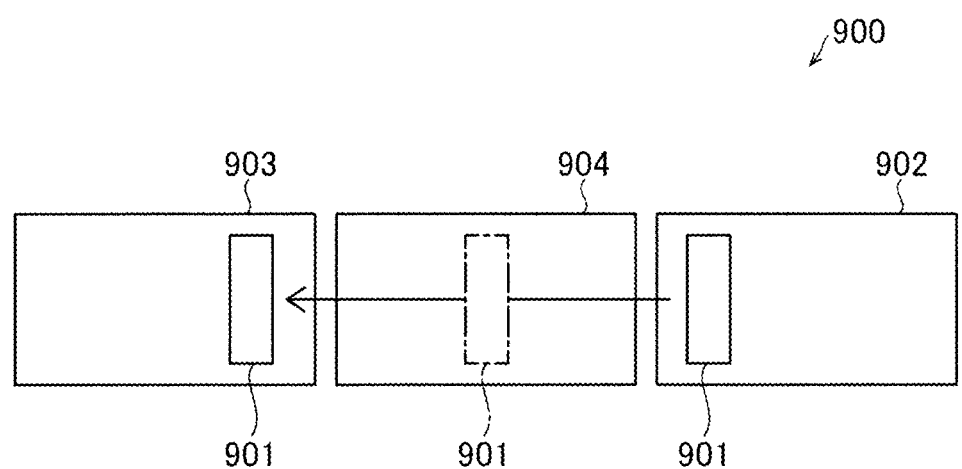
FIG. 12 is a diagram illustrating the related art.

When an end instruction is received in step S11 of FIG. 11, the controller 50 determines whether or not the smear preparing apparatus 20 is in operation in step S12. When the smear preparing apparatus 20 is in operation, the determination in step S12 is repeated until the operation is ended. When the operation of the smear preparing apparatus 20 is ended, the process proceeds to step S13 where the controller 50 conducts the shutdown operation of the smear preparing apparatus 20.

The controller 50 determines whether or not the smear transporting apparatus 30 is in operation in step S14. When the smear transporting apparatus 30 is in operation, the determination in step S14 is repeated until the operation is ended. When the operation of the smear transporting apparatus 30 is ended, the process proceeds to step S15 where the controller 50 conducts the shutdown operation of the smear transporting apparatus 30. Here, the controller 50 may conduct the shutdown operation of the smear image capturing apparatus 40 likewise.

The controller 50 turns off the power supply to the smear preparing apparatus 20 in step S16. Moreover, the controller 50 turns off the power supply to the smear transporting apparatus 30. Then, the apparatus ending process is terminated.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A testing system comprising:
a smear preparing apparatus that prepares a smear slide by smearing a sample on a glass slide;
a smear transporting apparatus that transports the smear slide;
a controller; and
a display part, wherein
the controller causes the display part to display a selection screen on which one or more of the smear preparing apparatus and the smear transporting apparatus can be selected, and
based on a selection on the selection screen, the one or more of the smear preparing apparatus and the smear transporting apparatus selected on the selection screen run respective start operations.

2. The testing system according to claim 1, wherein
the smear preparing apparatus comprises:
a smearing part that smears the sample on the glass slide; and
a fluid circuit that supplies a fluid, and
the smear preparing apparatus cleans at least one of the smearing part and the fluid circuit in the start operation.

3. The testing system according to claim 1, wherein
the smear preparing apparatus comprises a driving mechanism, and
the smear preparing apparatus initializes the driving mechanism in the start operation.

4. The testing system according to claim 1, wherein
the smear preparing apparatus comprises a staining part that stains the smear slide on which the sample is smeared, and
the smear preparing apparatus introduces a staining solution to the staining part in the start operation.

5. The testing system according to claim 1, further comprising:
a start switch, wherein
each of the smear preparing apparatus and the smear transporting apparatus comprises a master electrical switch, and
when the start switch is turned on in a condition in which the respective master electrical switches of the smear preparing apparatus and the smear transporting apparatus are on, the controller causes the display part to display the selection screen.

6. The testing system according to claim 5, wherein
when the start switch is turned on in a condition in which the master electrical switch of the smear preparing apparatus is on and the master electrical switch of the smear transporting apparatus is off, the controller causes the display part to display an error notification.

7. The testing system according to claim 1, wherein
the controller causes the display part to display a selection screen on which the smear transporting apparatus can be selected, and
the smear transporting apparatus runs the start operation in a condition in which the smear transporting apparatus is selected with the selection screen.

8. The testing system according to claim 1, wherein
the controller is provided in the smear preparing apparatus,
the controller controls operations of the smear preparing apparatus and the smear transporting apparatus, and
based on the selection on the selection screen, the controller causes the one or more of the smear preparing apparatus and the smear transporting apparatus selected on the selection screen to run the respective start operations.

9. The testing system according to claim 1, further comprising:
a smear image capturing apparatus that captures an image of the smear slide, wherein
the smear transporting apparatus transports, to the smear image capturing apparatus, the smear slide before image capturing and transports, from the smear image capturing apparatus, the smear slide after the image capturing, and
based on the selection on the selection screen, the controller causes the smear preparing apparatus and the smear transporting apparatus to run the respective start operations or causes the smear transporting apparatus to run the start operation.

10. The testing system according to claim 9, wherein
the smear image capturing apparatus comprises a controller,
the controller of the testing system and the controller of the smear image capturing apparatus are communicable each other and control the apparatuses in cooperation.

11. The testing system according to claim 1, wherein
the smear transporting apparatus comprises:
a magazine transporter that transports a slide magazine holding the smear slide, and
a sensor that detects the slide magazine being set in the magazine transporter, and
based on the slide magazine is detected by the sensor, the smear transporting apparatus transports the slide magazine by using the magazine transporter.

12. The testing system according to claim 1, wherein
the controller causes the display part to display an end selection screen on which ending of activities of the smear preparing apparatus and the smear transporting apparatus can be selected, and
based on a selection on the end selection screen, the smear preparing apparatus and the smear transporting apparatus end the activities after ending operations of the smear preparing apparatus and the smear transporting apparatus.

13. The testing system according to claim 12, wherein
in condition in which the smear preparing apparatus and the smear transporting apparatus end the activities, the controller causes the smear preparing apparatus to end the activity after ending the operation of the smear preparing apparatus, and then causes the smear transporting apparatus to end the activity.

14. The testing system according to claim 12, wherein
the smear preparing apparatus comprises a staining part that stains, with a staining solution, the smear slide on which the sample is smeared, and
in a condition in which the smear preparing apparatus ends the activity, the smear preparing apparatus discharges the staining solution from the staining part.

15. The testing system according to claim 12, wherein
the smear preparing apparatus comprises:
a smearing part that smears the sample on the glass slide; and
a fluid circuit that supplies a fluid, and
in the ending of the activity of the smear preparing apparatus, the smear preparing apparatus cleans at least one of the smearing part and the fluid circuit.

16. The testing system according to claim 12, wherein
the smear preparing apparatus comprises a driving mechanism, and
in the ending of the activity of the smear preparing apparatus, the smear preparing apparatus initializes the driving mechanism.

17. A testing system comprising:
a controller;
a display part;
a start switch; and
apparatuses each comprising a master electrical switch, wherein
when the start switch is turned on in a condition in which the respective master electrical switches of the apparatuses are on, the controller causes the display part to display a selection screen on which one or more of the apparatuses can be selected,
based on a selection on the selection screen, the one or more of the apparatuses selected on the selection screen run respective start operations,
the apparatuses comprise:
a smear preparing apparatus that prepares a smear slide by smearing a sample on a glass slide; and
a smear transporting apparatus that transports the smear slide, and
when the start switch is turned on in a condition in which at least one of the master electrical switches of the smear preparing apparatus and the smear transporting apparatus is off, the controller causes the display part to display an error notification.

18. A method of starting a testing system comprising
displaying a selection screen on which one or more apparatuses can be selected, and
causing each apparatus selected on the selection screen to run a start operation, wherein
the one or more apparatuses comprise a smear preparing apparatus that prepares a smear slide by smearing a sample on a glass slide,
the smear preparing apparatus comprises:
a smearing part that smears the sample on the glass slide; and
a fluid circuit that supplies a fluid, and
the smear preparing apparatus cleans at least one of the smearing part and the fluid circuit in the start operation.

* * * * *